INVENTORS
STURE TOORELL &
ERIK GRIP
BY Jarvis C. Marble
THEIR ATTORNEY

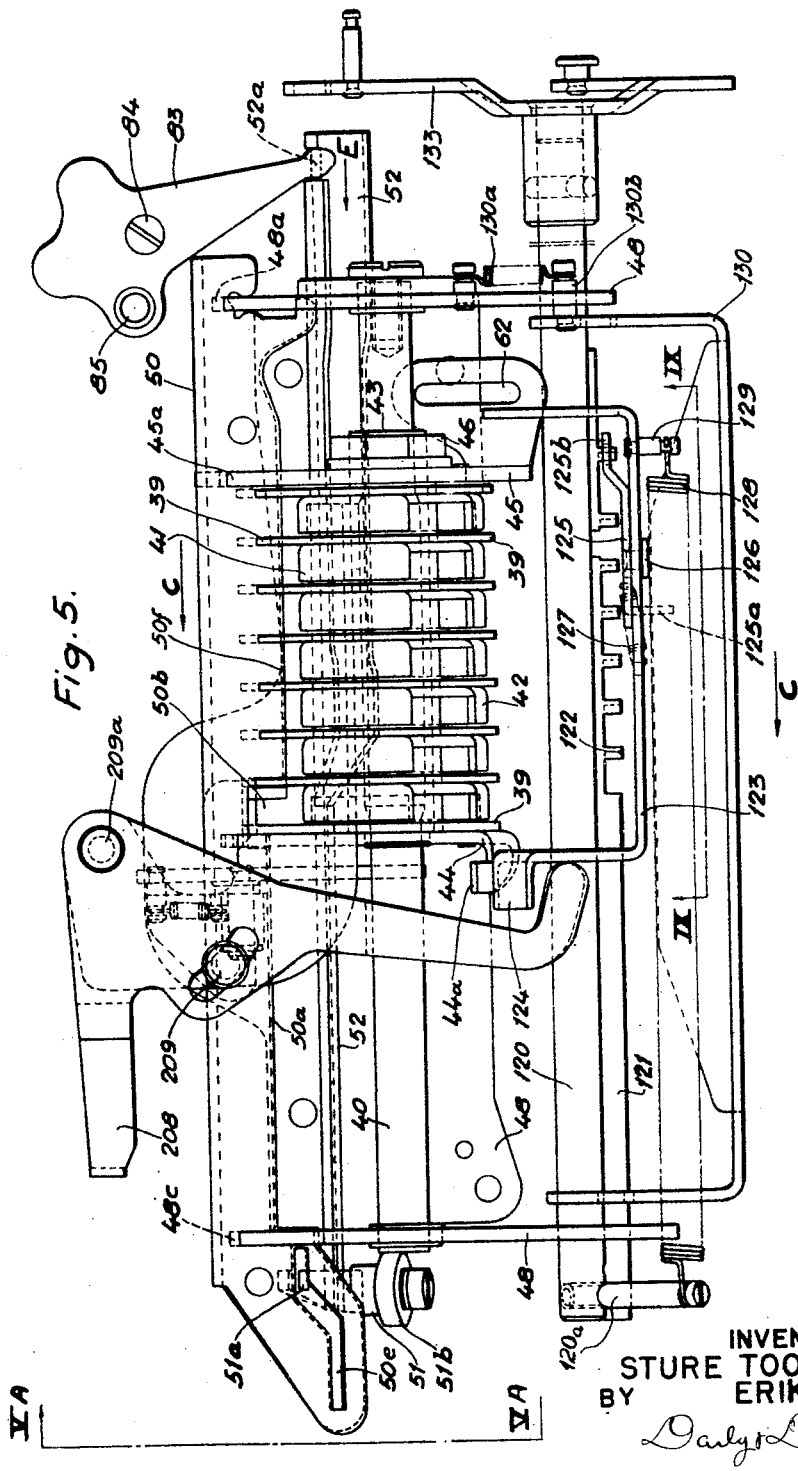

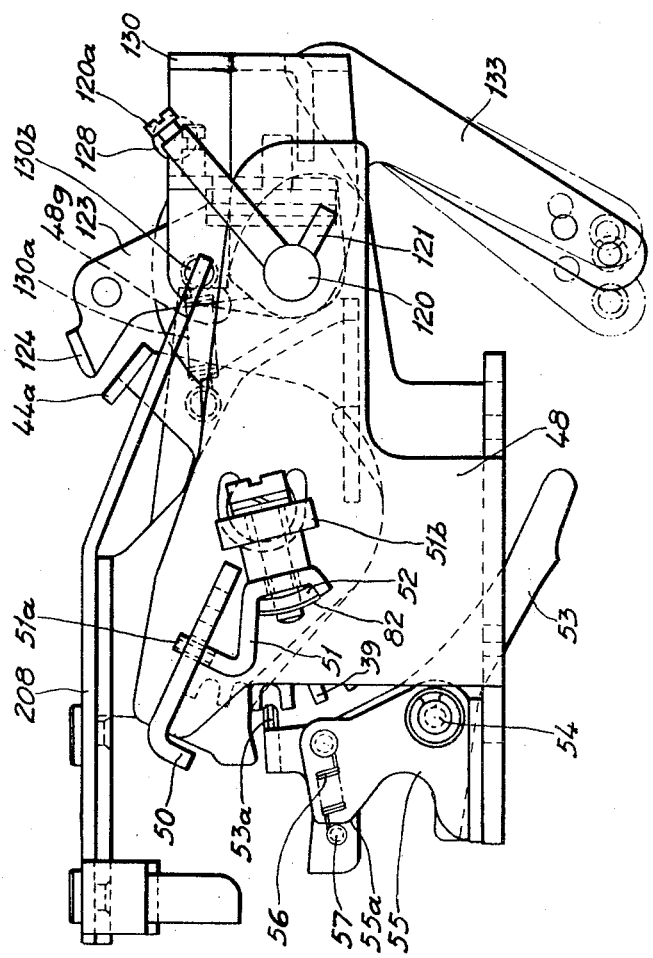

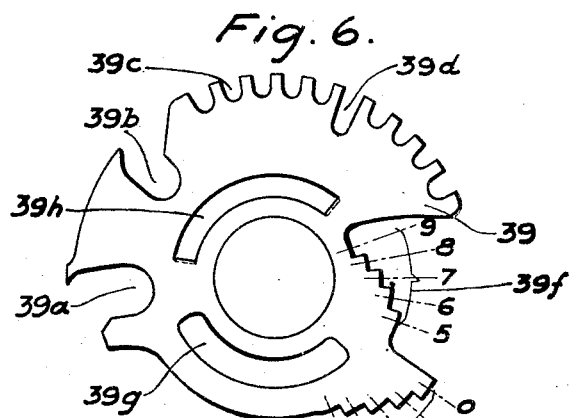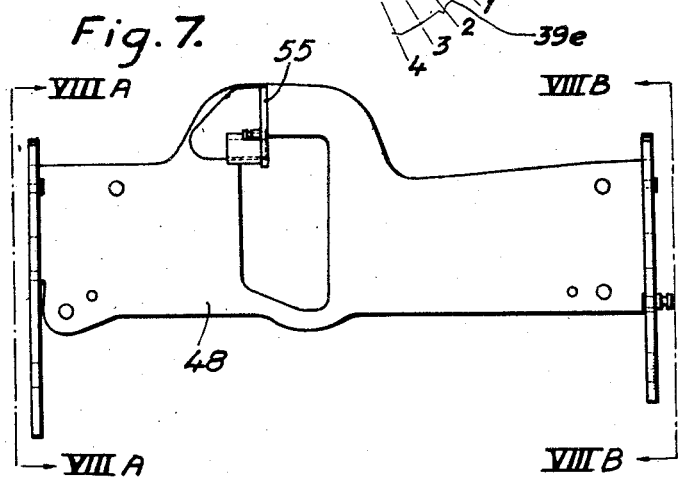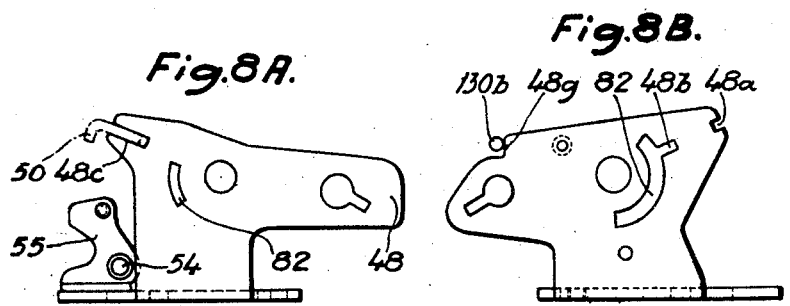

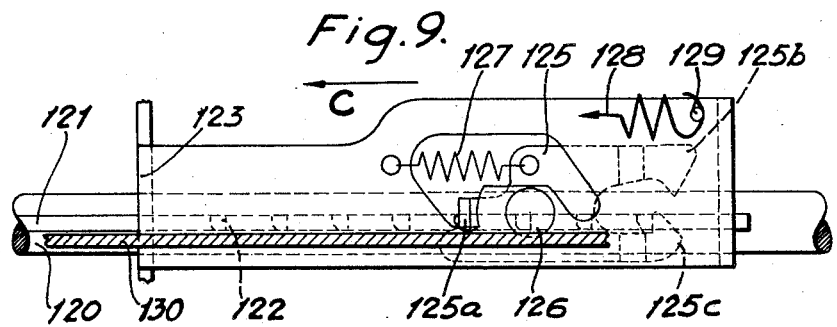
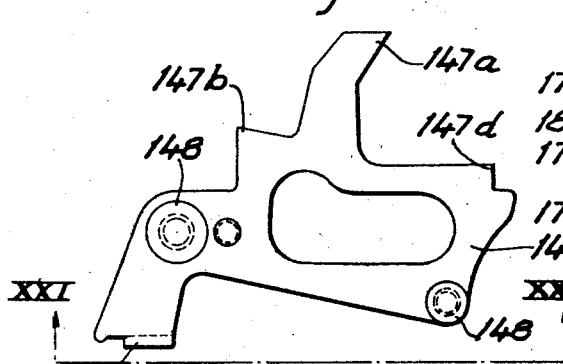
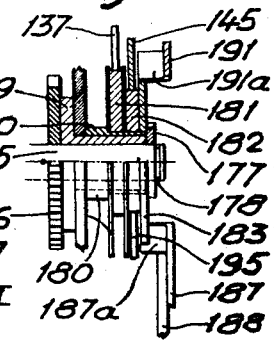
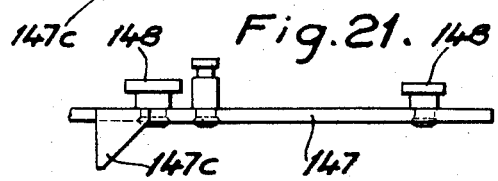
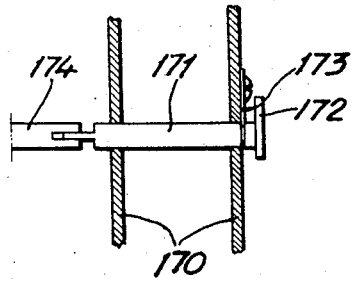
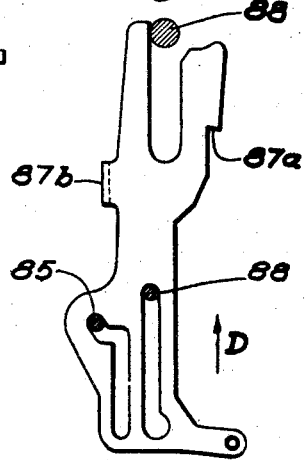
INVENTORS
STURE TOORELL &
ERIK GRIP
THEIR ATTORNEY

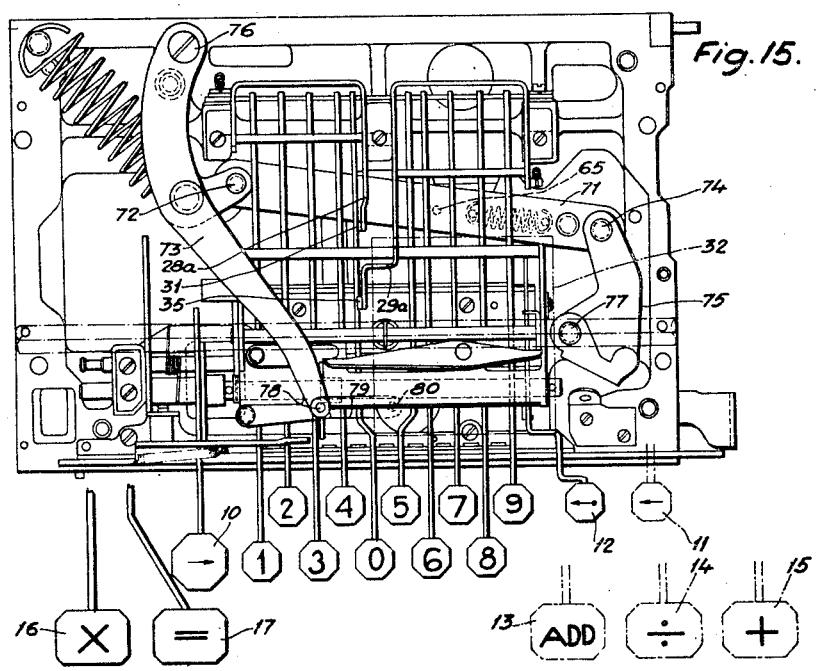

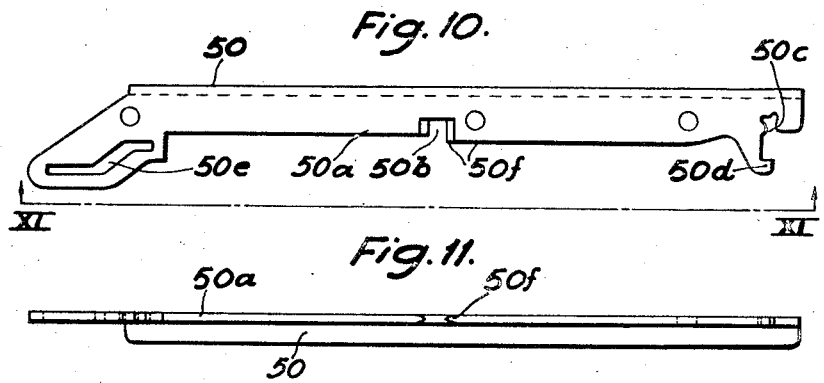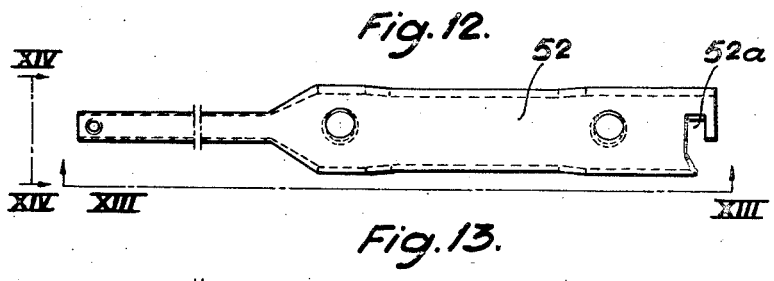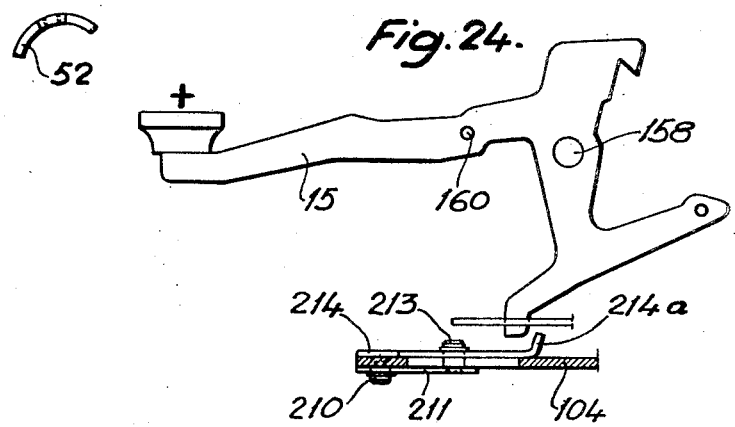

July 17, 1951     S. TOORELL ET AL     2,560,910
AUTOMATIC MULTIPLYING MACHINE
Filed Jan. 28, 1947     18 Sheets-Sheet 11
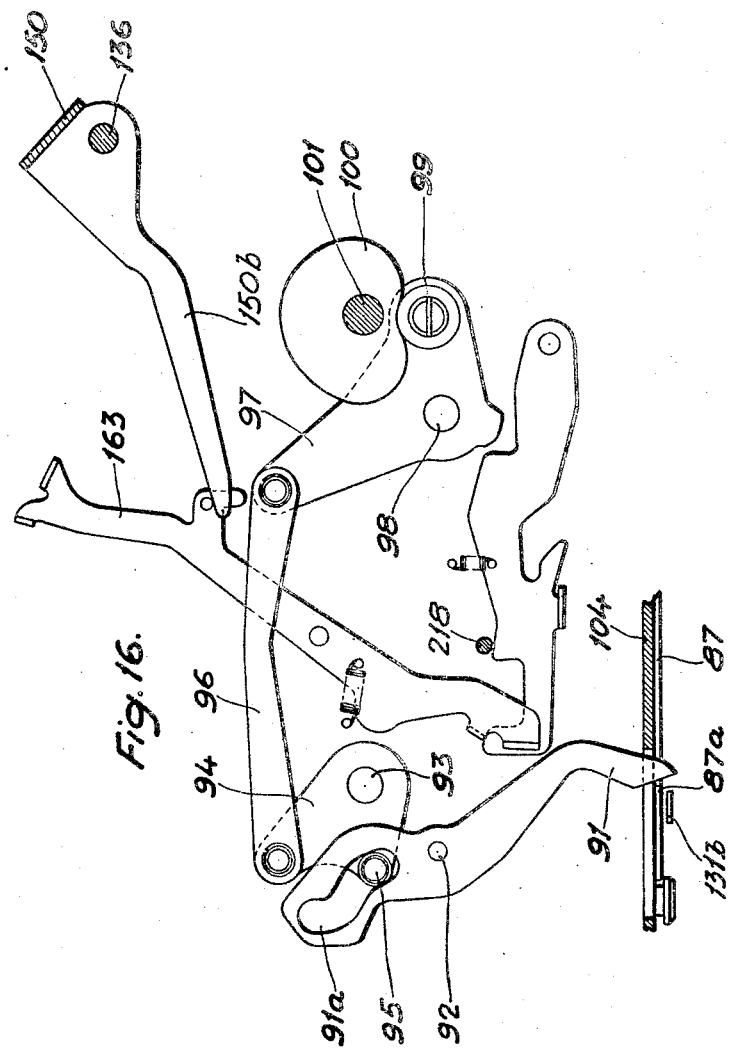
INVENTORS
STURE TOORELL &
ERIK GRIP
BY *Janier C. Marble*
THEIR ATTORNEY

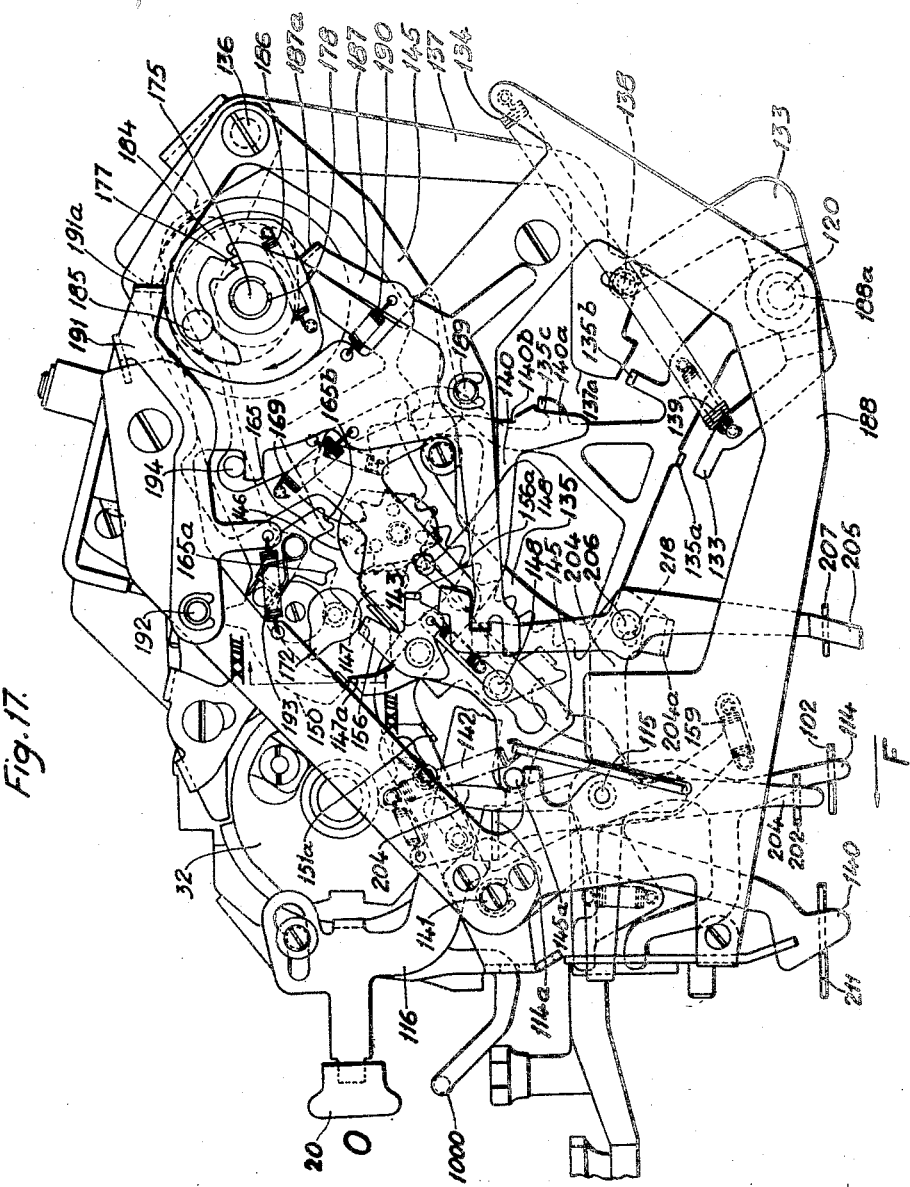

July 17, 1951 S. TOORELL ET AL 2,560,910
AUTOMATIC MULTIPLYING MACHINE
Filed Jan. 28, 1947 18 Sheets-Sheet 13
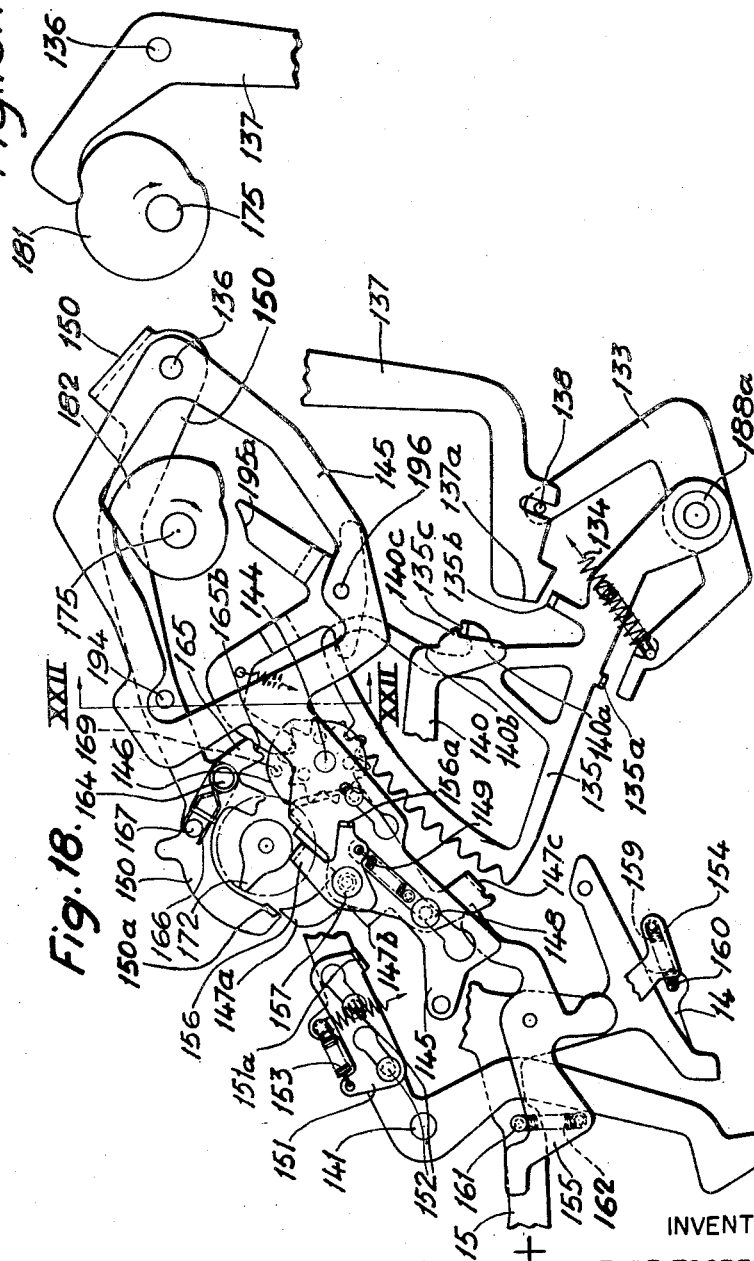
INVENTORS
STURE TOORELL &
ERIK GRIP
BY Jarvis C. Marble
THEIR ATTORNEY

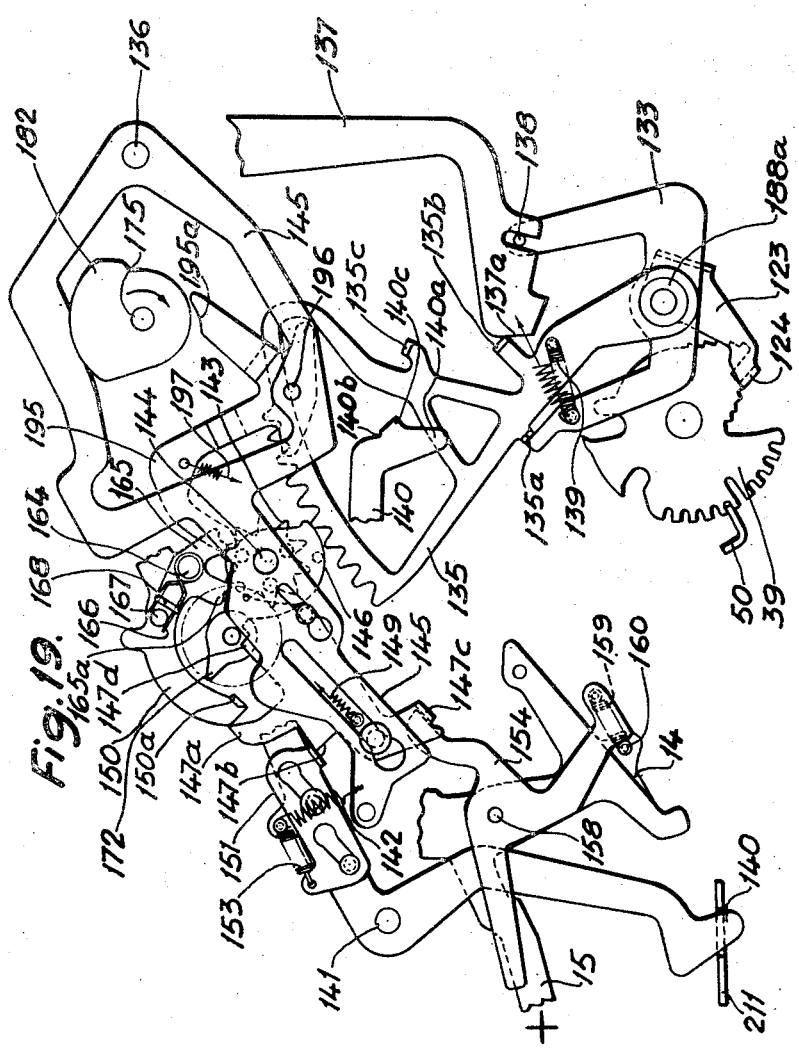

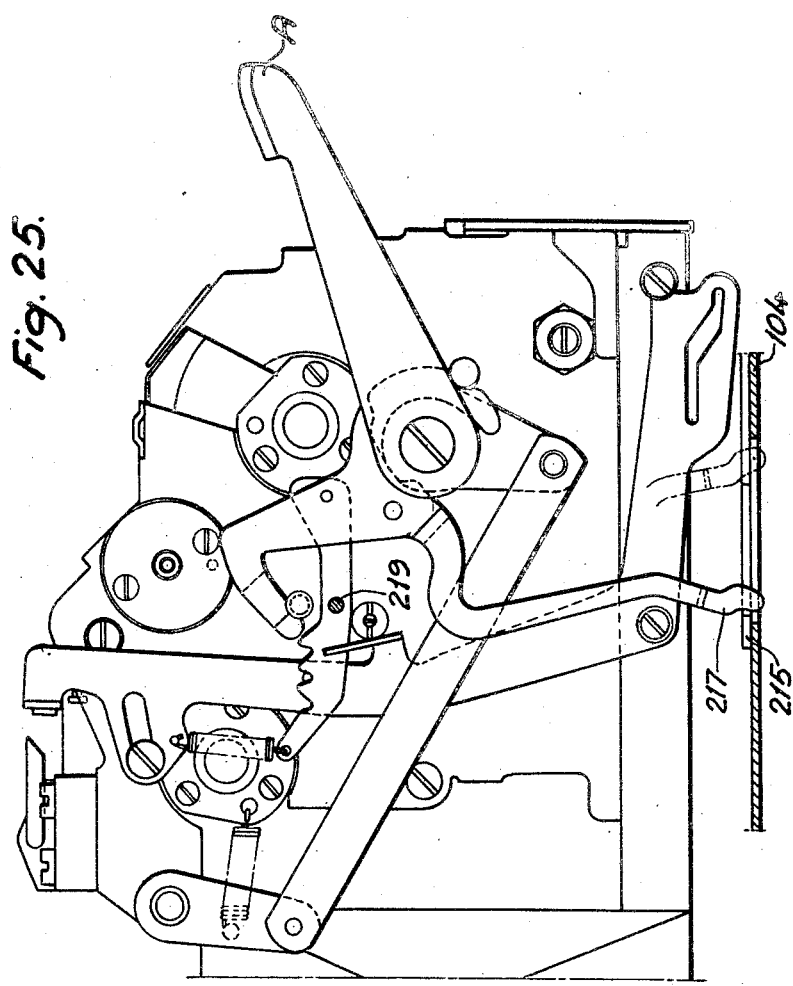

July 17, 1951  S. TOORELL ET AL  2,560,910
AUTOMATIC MULTIPLYING MACHINE
Filed Jan. 28, 1947  18 Sheets-Sheet 17
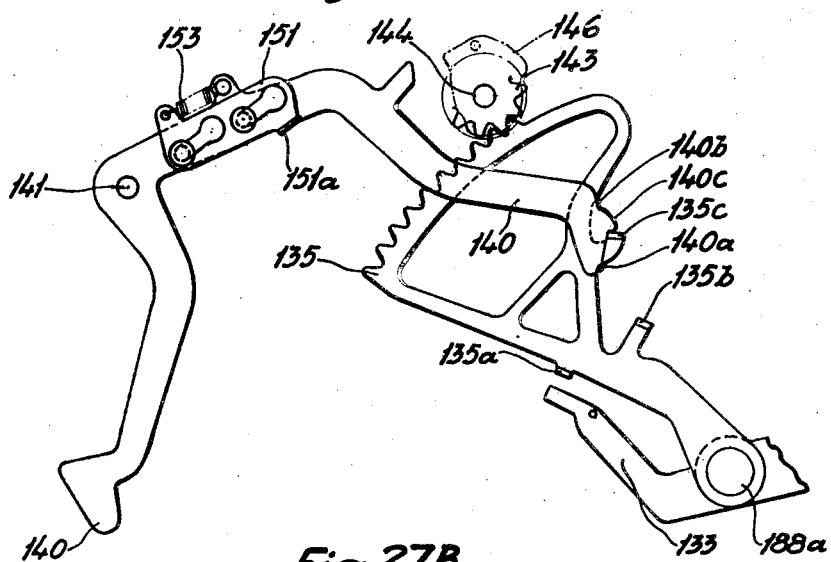
Fig.27.A.
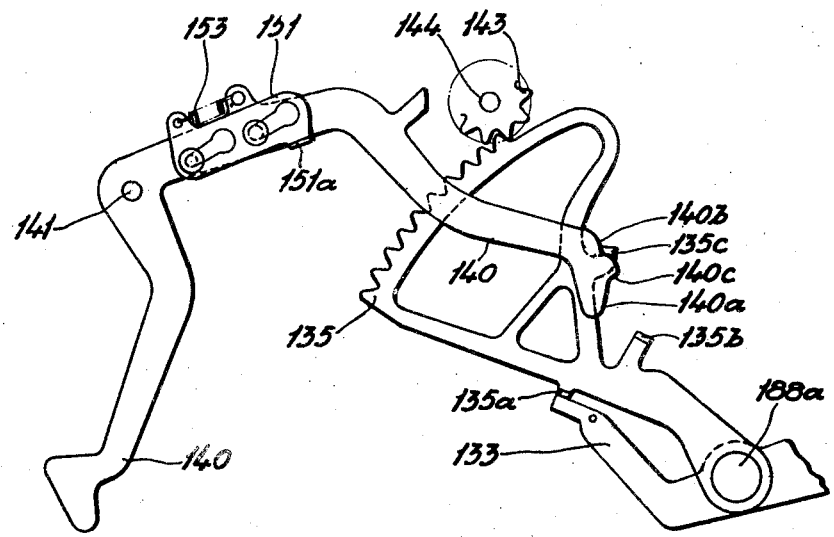
Fig.27B.
INVENTORS
STURE TOORELL &
ERIK GRIP
BY *James C. Marble*
THEIR ATTORNEY

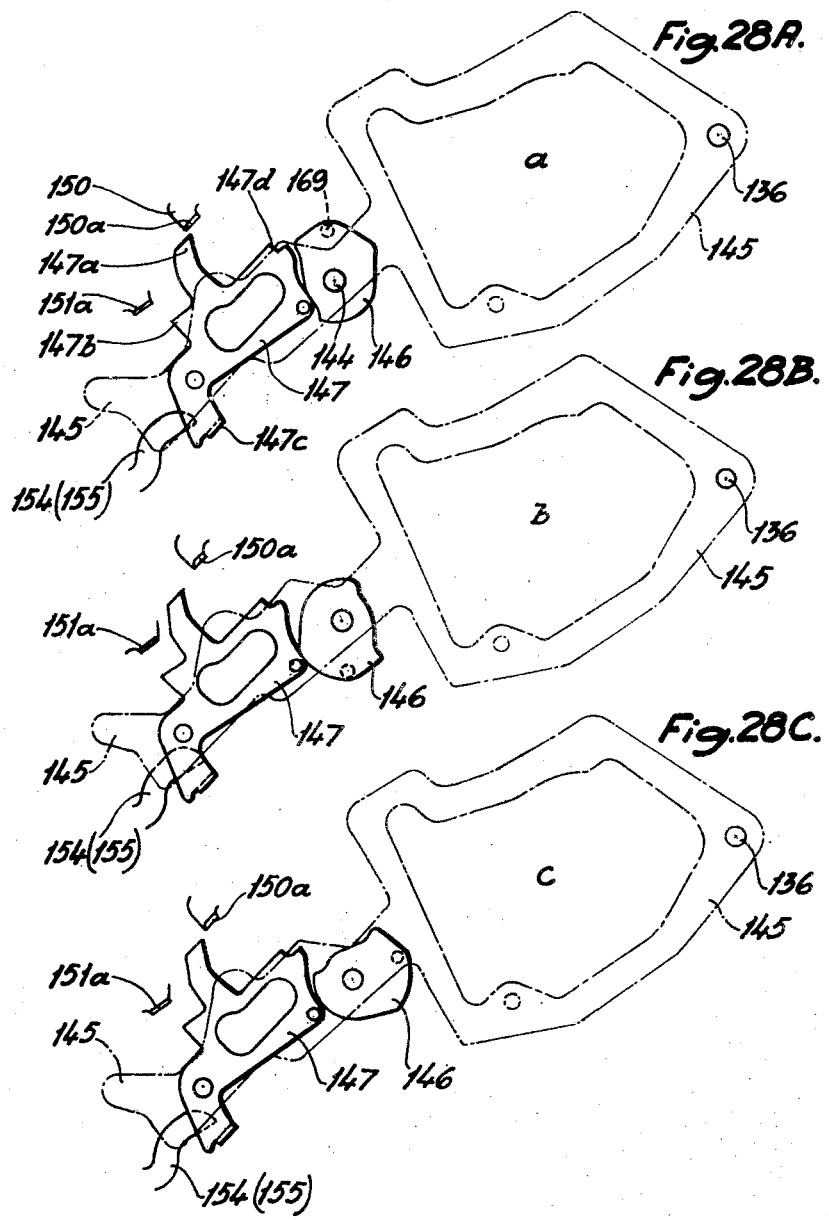

Patented July 17, 1951

2,560,910

UNITED STATES PATENT OFFICE 2,560,910

AUTOMATIC MULTIPLYING MACHINE

Sture Toorell and Erik Grip, Atvidaberg, Sweden, assignors to Aktiebolaget Facit, Atvidaberg, Sweden, a joint-stock company of Sweden Application January 28, 1947, Serial No. 724,800
In Sweden February 6, 1946

6 Claims. (Cl. 235—79)

This invention refers to calculating machines for automatic multiplication with two similar actuatorlike members, one utilized as a multiplier storage device and the other as an actuator for setting the multiplicand.

The chief object of this invention is to create devices which render it possible to set the multiplier simultaneously in a storage device for the multiplier and in the multiplicand actuator, the multiplier storage device being thereafter disconnected when the multiplicand is set into the multiplicand actuator.

Another object of this invention is to make the machine smaller since the multiplier storage device and the multiplicand actuator have a common indicating mechanism.

Another object of the invention is to make it possible to read both multiplier and multiplicand in the same indicator window. Thus, in setting the two factors in multiplication the operator need not move his eyes from one numeral indicator window to another and this results in easier operation and, as stated, makes the machine considerably smaller.

A further object of the invention is to provide a machine for performing multiplication automatically which is relatively simple, easy, and inexpensive in manufacturing and operates rapidly and reliably.

A still further object of the invention is to make it possible to set the multiplier storage device and the multiplicand actuator by means of the same compact, simple setting mechanism, this likewise making it possible to reduce the overall dimensions of the machine.

Other objects and features of the invention will be evident from the following specification and claims.

Fig. 1 is a cross-section through the machine.

Fig. 2 shows the machine from below, certain parts (particularly the motor and the driving aggregate) being broken away; Fig. 2 may be said to be a horizontal section on the line II—II in Fig. 1. The storage rotor is shown in its cleared position in Fig. 2.

Figs. 3A and 3B show details.

(Fig. 4 may be said to be part of Fig. 3 with certain parts broken away.)

Fig. 5 shows, viewed from the bottom of the machine, a detail of the storage rotor and adjacent parts.

Fig. 5A is an end view of the storage mechanism, viewed from the left in Fig. 5.

Fig. 6 is a detail of a disk of the storage rotor seen from the left (i. e. from a direction opposite to that in Fig. 1).

Fig. 7 shows a detail taken out from Fig. 4, viz. a part of the guide for the feeler carriage, viewed from below.

Figs. 8A and 8B show end views in the direction of the arrows VIIIA—VIIIA and VIIIB—VIIIB respectively in Fig. 7.

Fig. 9 is a detail of the step shift device for the feeler, viewed from the back side of the machine; Fig. 9 may be said to be a detail in the direction of the arrows IX—IX in Fig. 5.

Fig. 10 is a detail view of a portion of Fig. 5 and shows part of the feeler mechanism.

Fig. 11 shows the detail illustrated in Fig. 10, viewed in the direction of the arrows XI—XI in Fig. 10.

Fig. 12 is a detail view of the clearing wedge for the storage rotor.

Fig. 13 shows a view of the clearing wedge seen in the direction of the arrows XIII—XIII in Fig. 12.

Fig. 14 is an end view in the direction of the arrows XIV—XIV in Fig. 12.

Fig. 15 is a plan view of the lower part of the machine, the overlying parts being broken away to show more clearly the step shifting mechanism; the figure may be considered to be a section of the line XV—XV in Fig. 1 with certain parts broken away.

Fig. 16 is a detail view from the right side of the machine in the direction of the arrows XVI—XVI in Fig. 2.

Fig. 17 shows the machine seen from its right side, thus a view in the direction of the arrows XVII—XVII in Fig. 3.

Fig. 18 is a detail from Fig. 17 after certain parts have been broken away for better clearness; Fig. 18 shows the positions of the parts before the beginning of a feeling operation.

Fig. 19 is a view analogous to Fig. 18 and illustrates the positions of the parts after a feeling operation has been finished.

Fig. 20 shows a view of a detail of the storage mechanism of Fig. 17.

Fig. 21 shows a view in the direction of the arrows XXI—XXI in Fig. 20.

Fig. 22 shows a detail view in the direction of the arrows XXII—XXII in Fig. 18, the upper half of Fig. 22 showing the details in section.

Fig. 23 is a detail view of the coupling between the quotient counter actuator shaft and the actuating tooth of the feeler; this figure is a detail viewed in the direction of the arrows XXIII—XXIII in Fig. 17.

Fig. 24 shows a detail view in the direction of the arrows XXIV—XXIV in Fig. 3.

Fig. 25 shows a side view of the machine from the left, that is a view in the direction of the arrows XXV—XXV in Fig. 3.

Figs. 27A and 27B show details taken from Fig. 17 and illustrate the different positions of the correction arm.

Figs. 28A, 28B and 28C are also details taken from Fig. 17 and illustrate the three different positions for the slide determining in which direction the ordinary or main actuator works during automatic multiplication.

Figure 4:
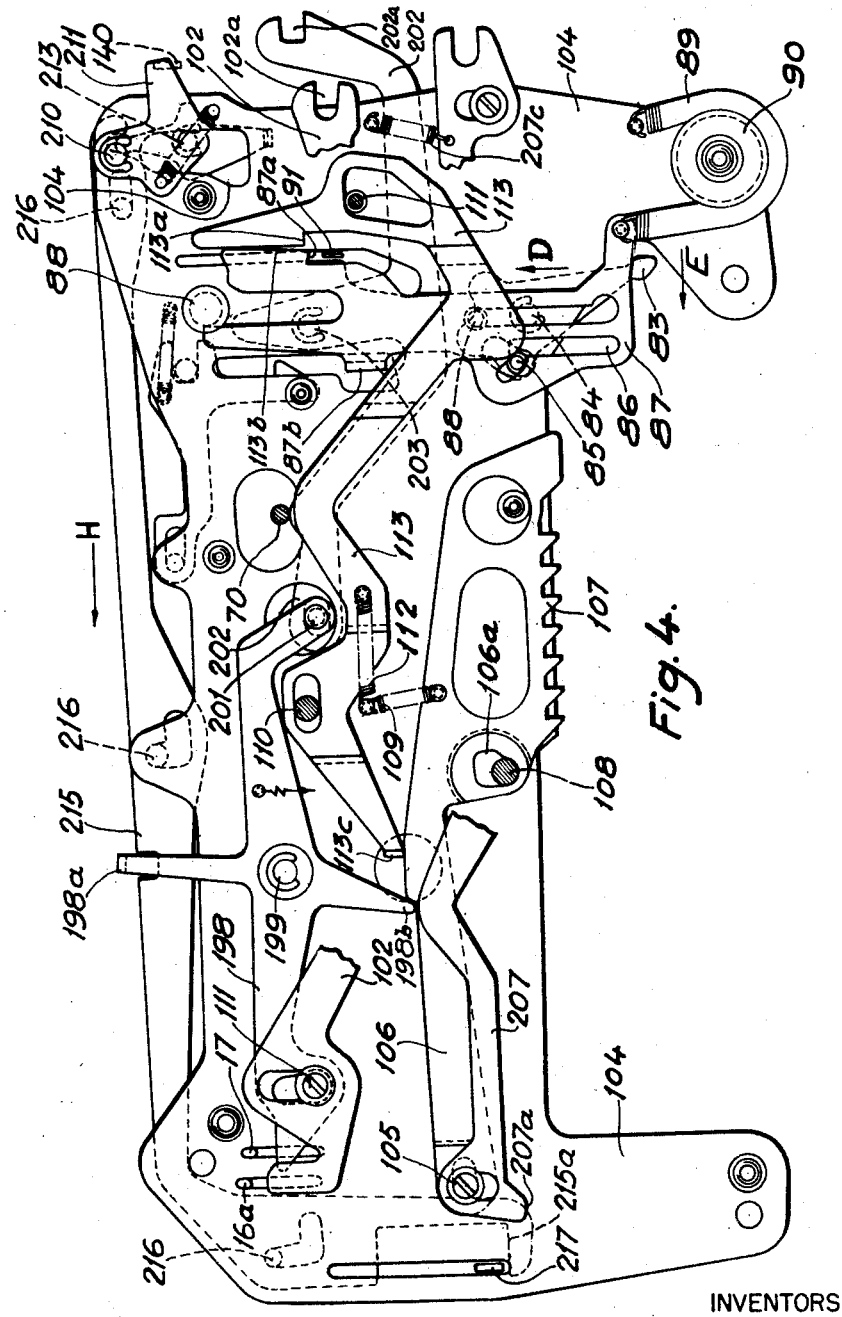
Fig. 4 shows a detail viewed from below, certain parts being broken away to show the parts below.
Figure 26:
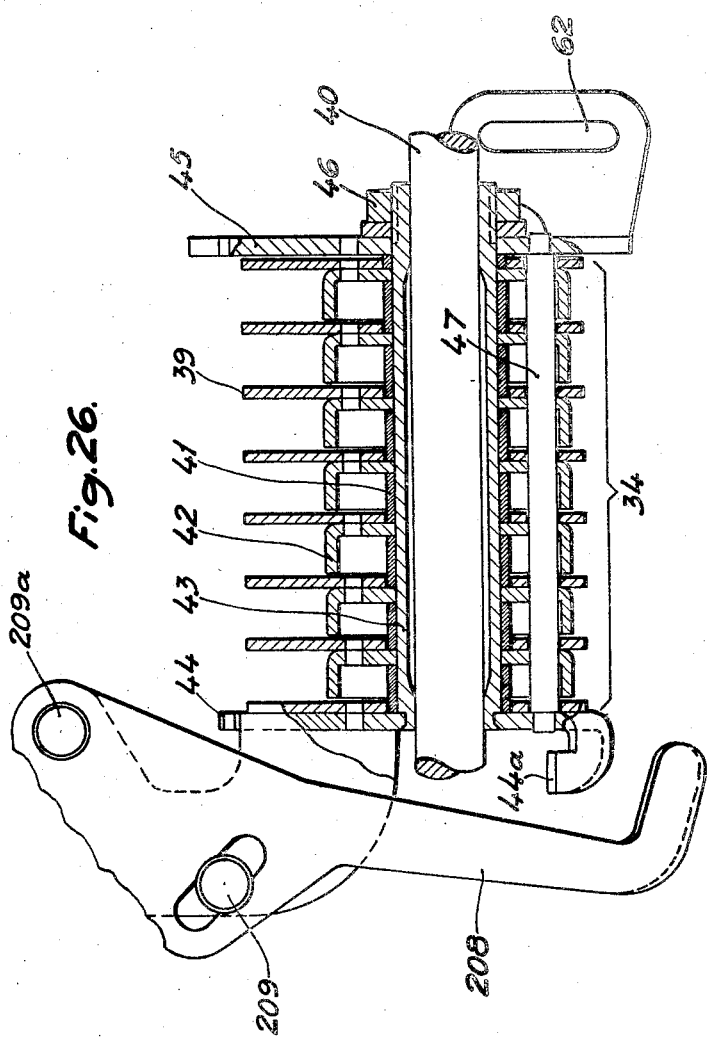
Fig. 26 shows an axial section through the storage rotor and illustrates the method of mounting it.

Finally, Fig. 29 shows a detail from Fig. 4.

It should be expressly mentioned here that several different scales have been chosen for the different figures in the drawings and that the scales have been chosen only for the purpose of obtaining a maximum of clearness in each particular figure.

For the sake of clearness in certain of the drawings only those parts are shown which are next to the spectator (next to the plane of the drawing), while remoter parts have been omitted; for the same reason parts have been completely or partially cut away in certain of the figures.

When not otherwise expressly states, the expressions "right," "left," "forwards," "backwards," "upwards" and "downwards" are used throughout this specification to indicate these directions as they appear to an operator sitting at the keyboard of the machine.

The calculating machine shown by way of example in the drawing is in its general features constructed in accordance with U. S. Patent No. 2,108,596, and is driven electrically with a driving aggregate in accordance with the U. S. Patent application No. 534.288, now Patent No. 2,488,011, and Patent No. 2,431,930, issued on December 2, 1947; moreover, the machine is constructed for automatic step shifting and automatic division in accordance with the U. S. Patent No. 2,398,286, issued April 9, 1946. However, the invention may of course, also be applied to other types of calculating machines.

A similar machine is shown in our copending application Serial No. 724,799. In the instant case the claims are directed to a means for simultaneously entering quantities into the differential actuator of the machine and into the multi-order storage device. In the copending application the claims are directed to the use of a single order sensing mechanism to sense sequentially the digital values stored in the multi-order storage device.

*General principle of the machine*

The calculating machine according to the invention has a single common keyboard for setting the two factors of the multiplication. First the multiplier is set by means of this keyboard. The item set is thereby simultaneously entered both into the differential actuator and into a special multiplier storage device connected in parallel with said differential actuator. For this purpose the setting members operated by the keys simultaneously set the differential actuator as well as the multiplier storage mechanism. When the multiplier is being entered, the multiplier storage mechanism is shifted step by step together with the differential actuator. During its rotation the differential actuator operates an accumulator (results register) in the usual manner, while the multiplier storage mechanism later (after the multiplicand is entered) serves to automatically control the number and the directions of the revolutions to be carried out by the differential actuator in each individual denomination of said accumulator.

After the multiplier has been simultaneously set in the differential actuator and in the storage mechanism as described above, a special operating key, for example marked ×, is depressed manually which causes the main actuator to be cleared, while, on the other hand, the item set (the multiplier) remains set in the storage mechanism, which upon the manual depression of the just mentioned special operating key × is disengaged from the setting members operated by said keyboard and possibly also from the step shifting members (if the keyboard is of the ten-key type). Now the multiplicand is set in the main actuator by means of the same keyboard (and this has no influence on the storage mechanism which has been disengaged from the setting members before this setting procedure as mentioned above. When now special operating key, which may be marked =, is depressed, the operation of multiplication is effected automatically, because the main actuator is caused to rotate in that direction and that number of times in each denomination of the accumulator which is determined by the numeral value of the multiplier which has been entered into the multiplier storage mechanism in the corresponding denomination.

After feeling has been effected in a certain denomination of the storage mechanism and the differential actuator has carried out its revolutions in accordance therewith for the corresponding denomination of the accumulator, the main actuator and the proper of the feeler mechanism are shifted one step to the next denomination in which feeling then takes place, etc. etc. The automatic multiplication is continued in this way until the multiplicand has been multiplied by the whole multiplier set in the storage mechanism and sensed by the feeler mechanism.

Figure 1:
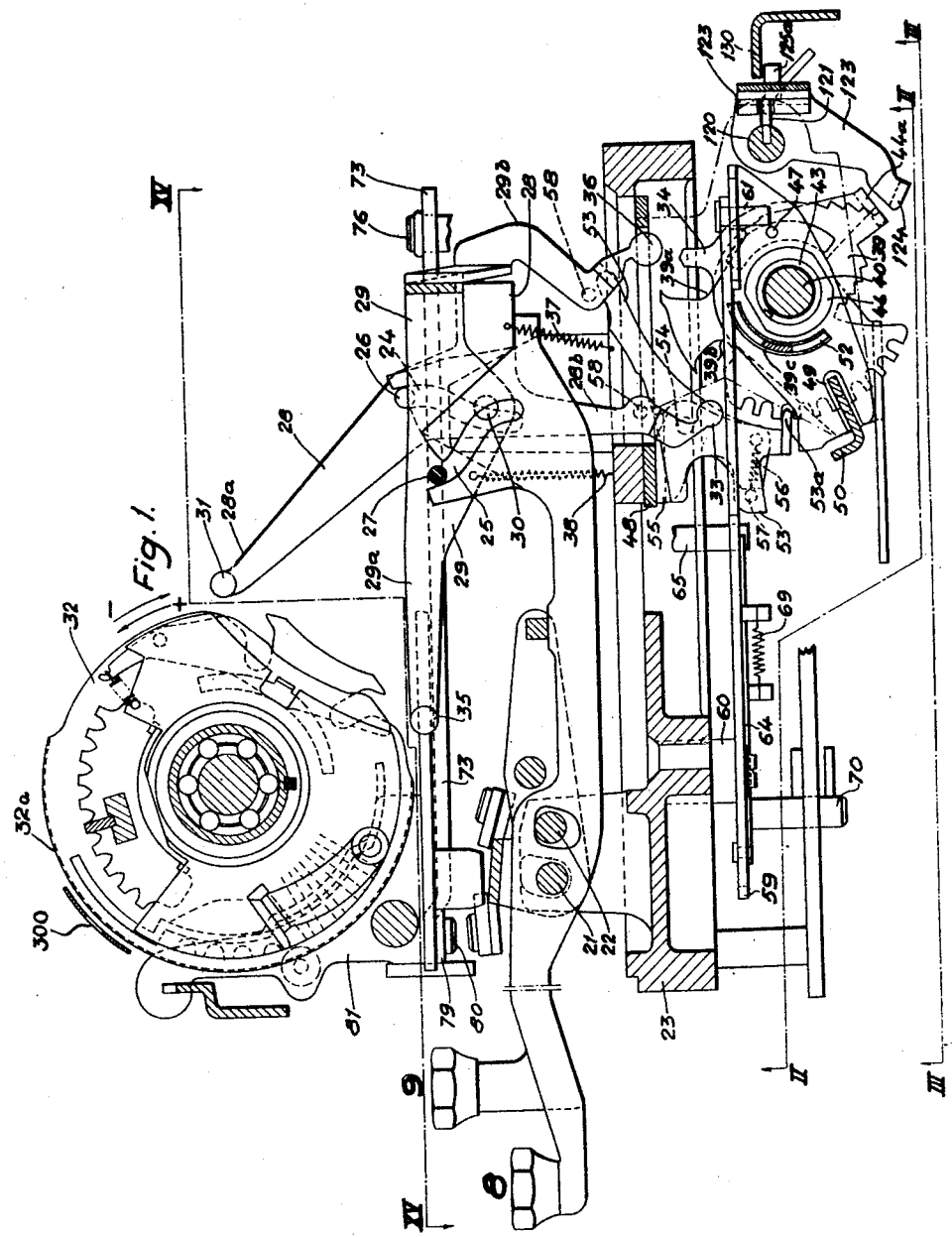

The same step shifting mechanism is preferably used both for the main actuator and for the feeler mechanism, and this considerably simplifies the construction. Yet it should be observed that during the setting of the multiplier the multiplier storage mechanism, and the differential actuator (such as a pin wheel rotor), are shifted stepwise together, whereas during the operation of feeling the multiplier entered the multiplier storage mechanism stands still while the feeler proper (the feeler arm) is shifted stepwise together with the main actuator. The latter is in the usual manner provided with reading members 32a (Fig. 1) or is coupled to such members so that at the setting the multiplier and the multiplicand respectively may be read successively. The result may be read in the accumulator or results register after the end of the calculating operation; and simultaneously the revolutions counter shows the multiplier. The calculating operation having been finished, the two factors (multiplicand and multiplier) and the result may thus be read for control purposes.

During automatic multiplication the feeler mechanism should preferably be operated without clearing the multiplier set in the storage device. After multiplication has been finished the multiplier remains in the storage mechanism. If now the clearing key (the 0 key) is depressed, the main actuator and the storage mechanism as well as the feeler proper are simultaneously cleared. If, on the other hand, the × key is depressed, only the main actuator and the feeler are cleared, while the multiplier remains set in the storage mechanism. A new multiplicand may then be set in the differential actuator, and in an analogous manner (by manual depression of the = key) this multiplicand may be multiplied by the multiplier remaining from the preceding calculating operation. Consequently, the machine can quickly and easily carry out a series of multiplications by a given, constant factor.

If first a factor (multiplier) is set simultaneously (in the same setting operation) in the actuator and in the storage mechanism as described above, and then the = key (instead of the × key) is depressed, evidently the item set is immediately squared, because one and the same item is set in the actuator as multiplicand and in the storge mechanism as multiplier. Therefore, squaring operations may be effected very quickly and simply.

The number of revolutions which the ordinary actuator is to effect in each denomination, is controlled by a gear segment connected with the feeler, said gear segment advancing a gear wheel as many steps as indicated by the numeral sensed in the corresponding order of the storage mechanism. When this has been effected, the gear wheel is disengaged from the segment and is brought into engagement with a tooth (counting tooth) which successively counts the gear wheel back to zero one step at each revolution of the actuator. (Said counting tooth is coupled to the shaft of the revolutions counter actuator.) Thus, when the gear wheel has been returned to its zero position, the main actuator is stopped in its full-cycle position and is shifted one step together with the feeler whereafter feeling is effected in the same manner in the next denomination. When finally the whole multiplier in the storage mechanism has been sensed in this manner and thus the automatic operation of multiplication has been finished, the machine is stopped.

In order to make the operations of calculation as rapid as possible the operation of automatic multiplication according to the invention is carried out according to the short-cut method, that is: with the least possible number of revolutions in each denomination. For this purpose said gear wheel in the feeler mechanism is according to the invention provided with a cam or curve with three different levels or radii, viz. one for plus calculation, one for minus calculation and one for no calculation at all (no revolution). For plus calculation the differential actuator is rotated in plus revolutions and for minus calculation in minus revolutions (that is in the direction of rotation which is opposite to the direction of plus revolutions). At "no revolutions" the actuator does not make any revolution at all (but is only step shifted one step to the next denomination).

Preferably, said cam actuates a slide which thus by the different cam levels is set in three different positions, and the position of the slide determines in which direction the differential actuator is to rotate. The plus calculation position (plus revolutions position) of the cam and slide corresponds to the numerals 1-5 in the corresponding denomination of the multiplier, while their minus calculation position or minus revolutions position corresponds to the numerals 6-9 in the corresponding denomination of the multiplier. The zero position (no revolutions position) of the cam slide corresponds to the number 0 in the corresponding denomination of the multiplier. In its plus revolutions position the slide causes the main actuator to rotate from 1 up to 5 revolutions in the plus direction (positive direction, direction of addition) in the decade concerned. In its minus revolutions direction the slide causes the main actuator to rotate in the minus direction (negative direction, direction of subtraction). The number of revolutions in that minus direction constitutes the complementary value of the multiplier numeral (6-9) in the denomination concerned. If this multiplier numeral is "6," for example, the setting main actuator effects 10−6=4 minus revolutions. After minus revolutions have been effected in one denomination, the sensed numeral in the next highest denomination must be automatically increased by one unit. This is most simply effected by moving the gear segment in the feeler mechanism one additional step (either at the beginning or at the end of the feeling motion of the gear segment).

Thus the construction becomes very simple and reliable in operation, and the machine operates very rapidly in performing automatic multiplication.

Moreover, the machine may in well known manner effect automatic division and addition and subtraction. Consequently, the machine may be used for many purposes.

According to the invention the machine may be constructed in such manner that it subtracts a particular product from previously accumulated products. For this purpose the machine is provided with a selector device which reverses the direction of rotation of the differential actuator in accordance with the manual setting of said selector device by the operator. Normally, the direction of rotation of the main actuator is determined, as described above, by the numerals 1-5 being counted in the positive direction of rotation and the numerals 6-9 in the negative direction. But if the machine is set to subtract a product, the directions of rotation are reversed in the different cases so that the multiplier numerals 1-5 are counted in the negative direction of rotation of the main actuator, while the numerals 6-9 are counted in the positive direction. However, the direction of rotation of the quotient tooth and of the revolutions counter actuator and also that of the counting tooth connected therewith is not reversed.

*Keyboard.—Amount setting*

Besides the ten amount setting or item keys 0—9 (Fig. 15) the machine has the following operating members in the embodiment shown:

(a) Right step shifting key 10 for step shifting the differential actuator to the right; the key is marked with an arrow directed to the right.

(b) Left step shifting key 11 for step shifting the actuator to the left; the key is marked with an arrow directed to the left.

(c) Total tabulation key 12, at the depression of which the actuator is moved to its left end position (for division); the key is marked with an arrow directed to the left with a circle in its rear end.

(d) Addition key 13 marked Add.

(e) Subtraction and division key 14 marked ÷; the key is preferably called multi-revolutions minus key.

(f) Multiplication key 15 marked +; the key is preferably called multi-revolutions plus key.

(g) Multiplier key 16 marked ×.

(h) Products key 17 marked =.

Figure 2:
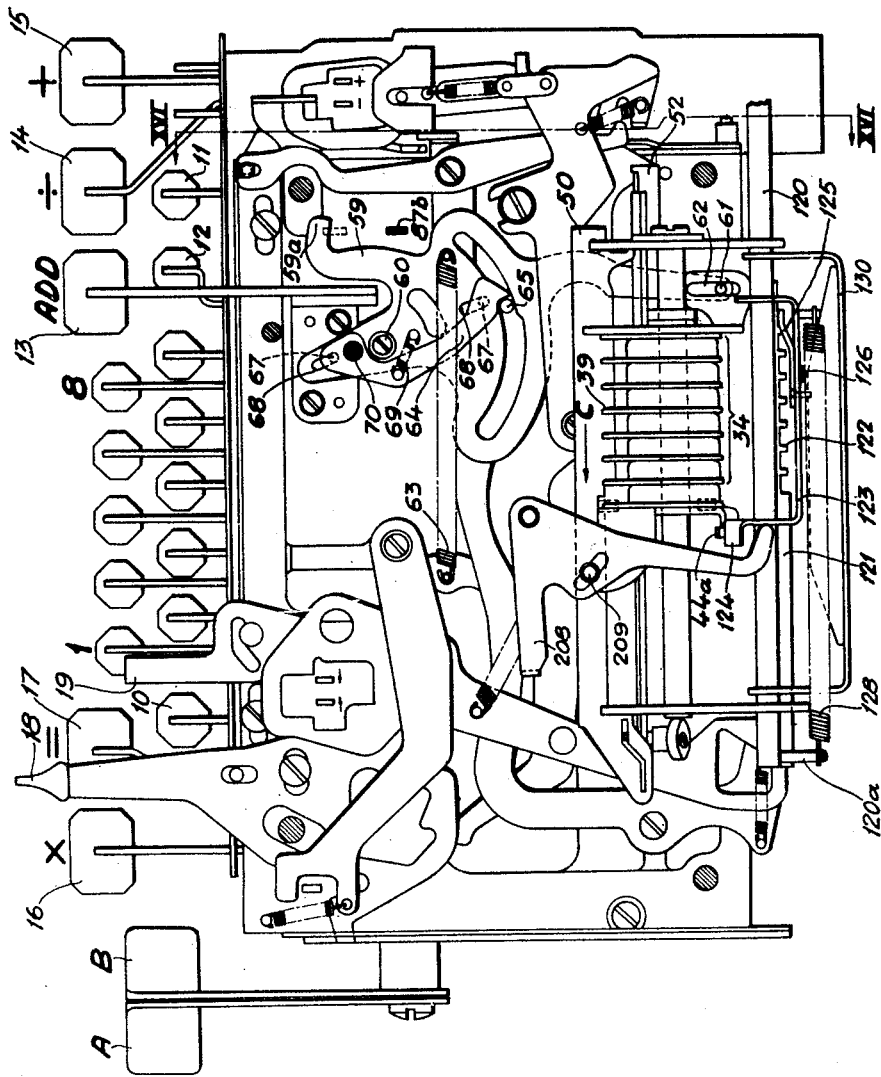

Furthermore, the machine has a chief control lever 18 (Fig. 2) with a disconnecting lever 19 for setting the machine to multiplication and to division, a clearing key 20 (Fig. 17) for the actuator and for the multiplier storage mechanism, and finally also a minus shifting lever 1000 (Fig. 17) for setting the machine for subtraction according to the British Patent No. 551,311 (=U. S. Patent No. 2,398,286); the parts 0—15 are likewise constructed according to said patent. However, according to that patent the clearing key serves to clear the main actuator mechanism only (but not a multiplier storage mechanism). Moreover, for the registers (the accumulator and the revolutions counter, respectively) there are, of course, the usual clearing members operated by the levers A and B (Fig. 2).

The amount keys 0—9 are rotatably journalled on the shafts 21 and 22 respectively (Fig. 1) which are fixed in the machine frame 23. (The keys in one key row are journalled on the shaft 21 and the keys in the other key row on the shaft 22.) At their rear ends said keys are provided with curved slots 24 (in the keys 0—4) and 25 respectively (in the keys 5—9) and said curved slots or cam slots are adapted to cooperate with pins 26 and 27 respectively on setting levers 28 and 29 respectively. Said setting levers are rockably journalled on pins 30 which are fixed in the machine frame. The setting lever 28 has two arms, namely, one arm 28a with a pin 31 for cooperation with the usual differential actuator 32 and an arm 28b with a pin 33 for cooperation with the multiplier storage mechanism 34. In an analogous manner the setting lever 29 has two arms, namely an arm 29a with the pin 35 for setting the actuator 32 and an arm 29b with a pin 36 for setting the multiplier storage mechanism 34. (On the whole, the construction comprises the amount setting mechanism shown in U. S. Patent No. 2,108,596 in duplicate.) Springs 37, 38 are provided to normally hold the setting levers 28, 29 in their positions of rest shown in Fig. 1. The actuator discs carry engraved numerals (0, 1, 2–9) on their external cylindrical surfaces 32a (Fig. 1) which may be read through a window 300. Thus the actuator discs themselves also form the indicator register.

*Multiplier storage mechanism*

The main actuator 32 and the registers (not shown) are preferably constructed as indicated in the above mentioned patents.

The storage mechanism consists of a disk 39 for each denomination (Figs. 1, 5, 5A, 6 and 26). These disks 39 are rotatably journalled on a shaft 40, said disks being arranged on distance tubes 41 and guided by bowl-shaped cups 42. The tubes 41 and the cups 42 are pushed on a tube 43, at one (the left) end of which an end plate 44 is soldered (or fixed in some other way). At the opposite end of the tube an end plate 45 is arranged which is secured by a nut 46 screwed on to the tube. The cups 42 are guided by a bolt 47 (Figs. 1 and 26) which is guided by apertures in the end plates 44 and 45. Thus, the disks 39 and the parts 41—47 form a rotor 34, which to a certain extent is analogous to the pin wheel rotor or actuator 32. The shaft 40 of this rotor 34 is fixed at both ends in a U-shaped bearing member 48 (Figs. 1 and 5) which is screwed on to the lower side of the bottom plate of the machine. In the end plates 44, 45 of the rotor 34 there are slots 49 for the locking slide or bar 50 (Figs. 1, 5, 5A, 10, 11). The slots 49 guide the storage rotor when this rotor slides in the direction of the shaft 40 on the bar 50. Said locking bar is at its right end provided with a recess 50c and a hook or projection 50d and at its left end with a slightly S-shaped slot 50e. At the recess 50c the locking bar 50 enters a recess 48a (Figs. 5 and 8B) in the right leg of the U-shaped member 48 and the projection 50d engages the recess 48b in the same leg. Thus, the right end of the locking bar is held locked in the radial as well as in the axial direction (in relation to the shaft 40). Nevertheless, the left end of said bar can swing radially in the groove 48c in the left leg of the U-shaped member 48 (Figs. 5 and 8A).

The disks 39 are provided with recesses or grooves 39a, 39b (Figs. 1 and 6) which are engaged by the pins 36 and 33 respectively on the setting arms 29b and 28b respectively, when the amounts are being set in the feeler rotor. At its periphery each disk has nine shallow grooves 39c and a deep groove 39d. After a disk has been set by the setting arm 28b or 29b and the rotor is then moved one step to the left, one of the grooves 39c, 39d engages the locking edge 50a of the locking bar 50 (Figs. 5, 10, 11) so that the disk previously set is locked in its position. At their periphery the disks 39 are also provided with ten stepped shoulders 39e, 39f (Fig. 6) corresponding to the numerals 0–9. In Fig. 6 dash-and-dot lines marked with the numerals 0–9 show how these shoulders correspond to the numerical values. These shoulders cooperate with a feeler arm in the manner described in detail below. Moreover, the disks are provided with a circularly curved slot 39h for a clearing wedge 52 (Figs. 1, 5 and 12–14) and with a free run (idle) slot 39g for the bolt 47. Therefore, this bolt guides the cups 42 but does not prevent the rotation of the disks 39.

A projection 51a on the finger 51, which is screwed on to the left end of the clearing wedge 52, enters the curved slot 50e in the left end of the locking bar 50. The finger 51 also carries a buffer 51b. When the clearing wedge is in its extreme right position (position of rest) shown in Fig. 5 the projection 51a holds the locking bar 50 in its locking position so that said bar locks all disks 39 which are to the left of the recess 50b. At a clearing operation the wedge 52 is displaced to the left and then lifts the locking bar 50 so that it is disengaged from the disks 39 to the left of the recess 50b. The locking bar is operated by the clearing wedge and is not actuated by any springs.

In the lateral direction the setting arms 28b and 29b are located in front of the recess 50b (Figs. 5 and 10) in the locking bar 50. The disk 39 which is to be set, is thus located in said recess 50b and is thus not locked by the bar 50. This disk instead is locked by the projection 53a of the catch or swingable hook 53 (Fig. 1) which is rockably mounted on a pin 54 fixed on the mounting 55 (Fig. 1) which is fixed on the U-shaped member 48. A spring 56 presses the hook 53 to rest with its pin 57 on the edge of the stationary projection 55a (see also Fig. 5A). When either of the setting arms 28b, 29b is swung under the action of a depressed amount key, a pin 58 on the setting arm will strike against the edge of the hook 53 and move its tooth 53a out of engagement with the groove 39c in the then aligned clearing drive arm 91 moves forwards in the machine, i. e. to the left in Fig. 16 and upwards in Fig. 3, respectively, and engages the projection 87a on the operating slide 87 to move the latter in the direction of the arrow D. The flap 87b of this slide then strikes the catch 59a (Fig. 2) of the lever 59 which is turned counterclockwise in Fig. 2 and now via the pin 61 draws the feeler rotor back to its position of rest, i. e. extreme right position. The locking surface 45a (Fig. 3) acts upon the oblique, bevelled surfaces of the teeth 107 so that the locking device 106 is disengaged from the storage rotor.

Figure 3:
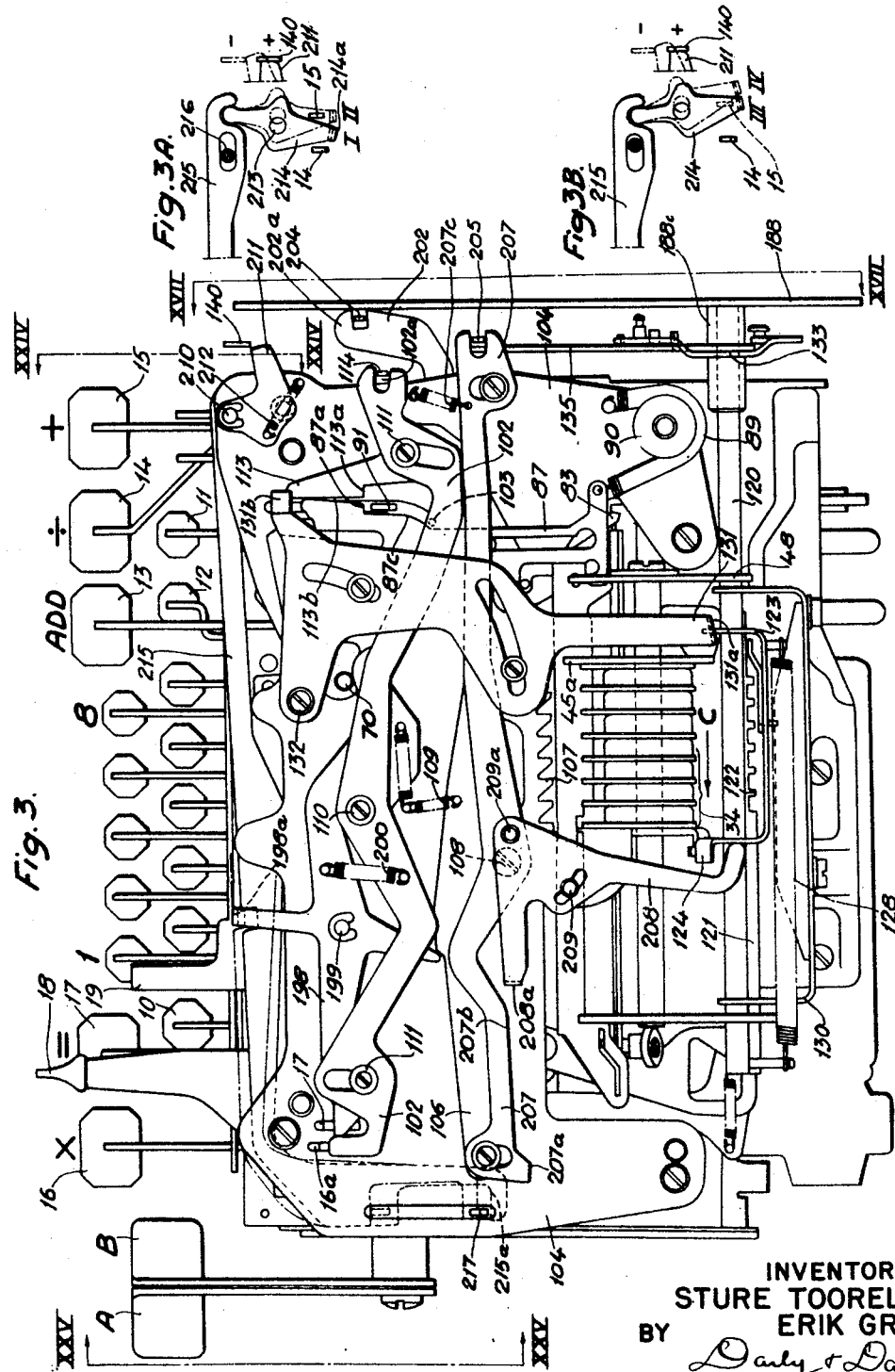
Fig. 3 shows a view of the machine from below, i. e. a view seen in the direction of the arrows III—III in Fig. 1.

In the manner indicated above the clearing wedge 52 of the storage rotor will be displaced to the left by the operating slide 87 via the lever 83 so that the disks 39 are cleared and successively have their recesses 39d engaged by the edge 50f of the locking bar (Fig. 5) and are locked in the zero position by it. Before the beginning of the clearing operation the left part (that is: the part to the left of the recess 50b in Figs. 10 and 5) has been lifted out of engagement with the recesses 39c, 39d in those disks which are located to the left of the recess 50b; this is effected in the manner described above due to the fact that the finger 51 via the projection 51a acts upon the cam slot 50e at the displacement of the clearing wedge 52 to the left. It should be observed that when the locking bar 50 is rocked upwards in Fig. 5, the edge 50f is not disengaged from those disks 39 located at said edge which are not set. It should be pointed out that the motion of the clearing wedge is sufficiently great so that the disks 39 are cleared when they pass the locking device 53a i. e. the motion is at least equal to the combined width of all multiplier storage wheel orders. Now the locking slide 64 engages the pin 65 (Fig. 2) so that the rotor 34 is cleared and is coupled again with the step shifting mechanism of the main actuator rotor 32. The operating slide 87 and thus also the clearing wedge 52 and the locking bar 50 return to their positions of rest under the actuation of the return spring 89 (Fig. 3).

*The feeler*

In the stationary U-shaped bearing member 48 a shaft 120 (Figs. 1–3, 5 and 17–19) is mounted which has an oblong groove in which a key 121 is inserted. Along a part of its length said key has a number of teeth 122 and the feeler arm 123 is displaceable along the shaft. The key 121 prevents the feeler arm from rotating around the shaft 120, and in the embodiment shown the feeler has the shape of a U-shaped member 123, the two legs of which are pushed on the shaft 120. One leg of the feeler has a bent over lug 124 which when the feeler is rocked clockwise in Fig. 1 strikes against one of the shoulders 39e, 39f on that feeler disk which is immediately in front of the feeler lug or projection 124. The amount setting previously made in this denomination of the storage rotor determines which of the shoulders 39e, 39f is in the path of rotation of the feeler projection 124, and the rotation of the shaft 120 from its position of rest until the feeler 123, 124 strikes against one of the shoulders 39e, 39f is thus determined by the numerical value entered in that denomination of the storage rotor.

On the feeler 123 a step shifting pawl 125 is pivoted on a pin or rivet 126 (see particularly Figs. 5 and 9) being actuated by a tension spring 127. This spring presses the projection or lug 125a of the pawl 125 towards an edge of the feeler 123. The feeler 123 is actuated by a tension spring 128, one end of which is fixed to a pin 129 on the feeler and the other end to a pin 120a on the shaft 120. The spring tends to move the feeler in the direction of the arrow C but is normally prevented from doing so because the tooth 125c on the pawl 125 engages one of the teeth 122. On the shaft 120 a U-shaped contact member 130 (Figs. 1–3, 5 and 5A) is pivoted. It is drawn to its position of rest by a spring 130a (Fig. 5A) in which position the pin 130b of that U-shaped member engages the shoulder 48g (Figs. 5A and 8B) on the U-shaped member 48.

When the shaft 120 rotates counterclockwise (Fig. 1), the projection 125a on the step pawl 125 strikes the shoulder 130 and is thus rotated clockwise (Fig. 9). The tooth 125c is then disengaged from the corresponding tooth 122 and the spring 128 draws the feeler 123 a distance in the direction of the arrow C until the feeler is stopped again, because a second tooth 125b on the step pawl 125 strikes against the same tooth 122 from which the tooth 125c has just been disengaged. When the feeler 123 is moved (clockwise in Fig. 1) back to its position of rest, the spring 127 draws the step pawl back counterclockwise (Fig. 9) so that its tooth 125b is disengaged from the tooth 122 just mentioned, and the feeler is drawn a further distance to the left by means of the spring 128 until the tooth 125c engages the next tooth 122. When thus the shaft 120 has been rocked once to and fro (first counterclockwise and then clockwise in Fig. 1) the feeler 123, 124 has been moved axially one step, i. e. the same distance as the axial distance between two disks 39. The rocking of the 123 to and fro for a feeling operation thus also effects that the projection 124 is shifted one step from one disk 39 to the next one. Thus, the rotor 34 stands still during the feeling procedure, but the feeler arm 123, 124 is shifted stepwise simultaneously with the actuator rotor 32.

A special clearing or restoring arm 131 (Fig. 3) pivoted on the stationary pin 132, is arranged for returning the feeler 123, 124 to its position of rest (its extreme right position).

When the two rotors 32 and 34 are being cleared, the arm 131 is actuated by the clearing drive arm 91 (Figs. 1 and 16) to be swung anticlockwise in Fig. 3. The fork-shaped end 131a of the arm 131 grips an edge of the feeler 123, which thus will be returned to its position of rest (extreme right position) when the arm 131 is swung counterclockwise as just mentioned. When the 0 key 20 (Fig. 17) is depressed, this will thus effect clearing of the rotors 32 and 39 as well as return of the feeler 123 to starting position.

At the right end of the shaft 120 an arm 133 (Figs. 3, 5, 17–19 and 27A and 27B) is fixed which a tension spring 134 tends to draw clockwise in Figs. 17–19. Furthermore, a gear segment 135 is pivoted on the pin 188a, which is fixed on the end plate 188 of the machine (see Figs. 3 and 7). (The pin 188a and the shaft 120 are coaxial.) This gear segment is provided with three projecting shoulders 135a, 135b and 135c for striking the edge of the arm 133, and the surface 137a and the correction arm 140, respectively. The surface 137a is provided on the swinging arm 137 which is pivoted on the stationary pin 136 and has a slot in which a pin 138 on the arm 133 slides. The surface 137a forms a curve or cam surface on which the shoulder 135b slides when the shaft 120 is rotated. Said surface prevents the shoulder 135b from leaving the arm 133 at the quick swinging motions concerned. At these motions the gear segment 135 will thus exactly follow the motions of the arm 133. A tension spring 139 is fixed between the arm 133 and the gear segment 135. A lug 135c projecting from the gear segment engages, when the segment is in its position of rest, a shoulder 140a on the correction arm 140 which is rockably journalled on the stationary shaft 141. A tension spring 142 tends to move this arm clockwise (Fig. 17). However, this movement is normally prevented by the bead 140c on the correction arm 140 resting on the shoulder 135c of the gear segment 135.

The teeth of the segment 135 are in permanent mesh with a counting gear wheel 143 which is pivoted on the pin 144 on the big arm 145. The feeler system consisting of the feeler proper 123, 124 (Figs. 1 and 19), the shaft 120 (Figs. 17 and 19) and the parts 133, 135, 143 is so dimensioned that the counting wheel 143 is rotated forwards one step (one tooth) when the feeler projection 124 (Figs. 1 and 19) strikes against a disk 39 in which the number "1" has been set (cf. Fig. 6). If the disk 39 in the denomination concerned has been set on "2," the gear wheel 143 is moved two steps etc. etc. always on the condition that at the beginning of its turning motion the gear segment 135 with its projection 135c rests on the shoulder 140a of the correction arm 140 (cf. Fig. 27A; this is the + position of the correction arm). But, if at the beginning of its turning movement the gear segment 135 with its projection 135c rests on the shoulder 140b (cf. Fig. 27B; this is the — position of the correction arm), the gear segment has been moved back exactly one pitch (one step or tooth) in relation to the counting gear wheel 143 so that the distance between the arm 133 and the projection 135a of the gear segment is reduced almost to nought. In the position of rest of the feeler arm 124 (Fig. 1) the distance between this arm 124 and the shoulder 39e on a feeler disk which is set on "0," corresponds to a rotation of the gear segment of one tooth (or in the practice slightly more). This means that, when the projection 135c of the gear segment contacts the shoulder 140b and the feeler 124 moves towards a disk 39 set to the numeral "0," the gear wheel 143 will be rotated 1+0=1 step; for a disk set to the numeral "1" the gear wheel 143 is in an analogous manner rotated 1+1=2 steps etc. For a disk set to the numeral "9" said gear wheel is therefore rotated 9+1=10 steps=a whole revolution (360°).

To the gear wheel 143 a cam disk 146 is riveted against the periphery of which a setting slide 147 (see also Figs. 20, 21 and 28A—C) rests. This slide is provided with pins 148 entering oblong slots in the big arm 145 so that the slide is displaceably mounted on said arm and is urged by a tension spring 149 to contact the periphery of the cam disk 146. The cam disk 146 has three different radii, and the slide 147 will consequently assume three different positions a, b, c determined by said radii (see Figs. 28A, 28B and 28C, respectively).

Position a (Figs. 17, 18 and 28A) corresponds to a rotation of the gear wheel 143 of "0" steps or (what is the same as respects angle) 10 steps from its position of rest. Position b (Fig. 28B) corresponds to a rotation of the gear wheel 1–5 steps from the position of rest, while if the gear wheel has been rotated 6 to 9 steps, the slide 147 reaches its position c (Fig. 28C).

This slide is provided with a projecting shoulder 147a which, when the slide is in its position a (Figs. 17, 18 and 28A), actuates the shoulder 150a of the arm 150 pivoted on the pin 136. The slide also has a shoulder 147b which actuates the projecting shoulder 151a of the small slide 151 which is displaceably mounted on the pins 152 fixed on the swinging arm 140. A tension spring 153 tends to hold the slide 151 in its zero position. The shoulder 151a is actuated by the shoulder 147b of the slide 147 only when the slide 147 is in its position b, which is shown in Figs. 19 and 28B. The setting slide 147 is also provided with a projecting portion 147c which, when this slide is in its position b (Figs. 19 and 28B) or c (Fig. 28C) actuates the two arms 154 (Fig. 18), 155 (Fig. 19) and rocks them counterclockwise when the arm 145 is lifted i. e. oscillated in a clockwise direction. The setting slide 147 finally has a fourth shoulder 147d, which may be hooked up on a hook or pawl 156, which is pivoted on the pin 157 fixed on the arm 145 and which is actuated by the tension spring 149. The two arms 154, 155 are mounted on the shaft 158 (this shaft is identical with the shaft 77 in the U. S. Patent No. 2,488,011.) To the arm 154 one end of a tension spring 159 is fixed the other end of which is fixed to the pin 160 of the minus-multi-revolutions key 14. This spring presses the edge of the arm 154 to engage the pin 160, as will be seen in Figs. 18 and 19. If the arm 154 is rocked counterclockwise (by the setting slide 147 in the manner described above) in Figs. 18 and 19, this movement will be transmitted to the minus-multi-revolutions key 14 by the spring 159. The pin 161 (Fig. 18) which is riveted to the plus-multi-revolutions key 15, engages the edge of the arm 155 under the actuation of a tension spring 162, which serves to transmit motion from the arm 155 to the + key 15. (The plus-multi-revolutions key 15 and the minus-multi-revolutions key 14 may be identical with the keys 75 and 76 respectively in the U. S. patent application Serial No. 534,288.) The arm 150, which is pivoted on the stationary pin 136, is bent in the shape of a U and carries at its opposite end (Fig. 16) an arm 150b, which acts on an impulse arm 163. When rocked clockwise as seen in Fig. 16, this arm (which is identical with arm 86 in U. S. patent application Serial No. 534,288) causes the rotor 32 to be stopped in a well-known manner in its full-cycle position and also causes the step shifting of this rotor to be started (see U. S. Patent No. 2,488,011). On a pin 164 a bell-crank lever 165 is pivoted being held in its normal position by a hair needle spring 166, the two legs of which rest from two directions on the pin 167 fixed on the arm 150 as well as on the projecting lug 168 of the bell-crank lever 165. The bell-crank lever or hook 165 may thus yield resiliently in both directions.

A pin 169 is riveted to the cam disk 146 fixed on the counting wheel 143. When the big arm 145, on which the shaft 144 for the cam disk is mounted, is lifted (clockwise in Figs. 17 and 18) in the manner described in detail below, this pin 169 is moved upwards in the direction towards the bell-crank lever 165. If now the cam disk 146 is in its zero position (Figs. 17 and 18), the bell crank lever 165 is not actuated. But if the cam disk 165 is in another position (say in the position shown in Fig. 19) and is rotated back to its zero position while the arm 145 is in its raised position, the pin 169 acts upon one of the surfaces 165a or 165b of the bell-crank lever 165 irrespective of the direction of the rotation. Due to this the arm 150 is lifted, which in the manner indicated above, causes the actuator 32 to be stopped in its full-cycle position and to be shifted one step.

*Counting tooth and revolutions counter actuator*

On a shaft 171 rotatably mounted in the machine frame 170 (Fig. 23) a counting tooth 172 is fixed. Shaft 171 is provided with a peripheral groove engaged by a plate 173 preventing displacement of the shaft in its longitudinal direction. In the manner shown in Fig. 23 the shaft 171 is permanently connected with the shaft 174 of the revolutions counter actuator (this shaft is indicated by 218 in the U. S. Patent 2,398,286). The shaft 171 will follow the rotation of the shaft 174 but simultaneously the slotted coupling allows the necessary axial displacement of the shaft 174 in relation to the undisplaceable shaft 171. The counting tooth or actuator 172, which always rotates in the same direction as the quotient tooth or revolutions counter actuator fixed on the shaft 174, advances the gear wheel 143 one tooth for each revolution of the shaft 174 when the arm 145 is in its raised position and for this reason the counting wheel 143 mounted on said arm is in the path of rotation of the counting tooth 172. But when the big arm 145 is in its lowermost position, the counting gear wheel 143 is not actuated by the counting tooth 172.

*Drive mechanism for the feeler*

Via the gear wheel 176 (Fig. 22) the shaft 175 is directly coupled with the driving motor of the calculating machine and rotates clockwise (Figs. 17-19). (In the U. S. Patent No. 2,488,011 the shaft 175 is indicated by 13 and the gear wheel 176 by 12a.) On shaft 175 a disk 177 is fixed which is provided with teeth (Figs. 22 and 17). The disk is keyed on the shaft 175 and follows the rotation of that shaft. A spring washer 178 prevents the disk 177 from being displaced in the axial direction. Shaft 175 rotates in the bushing 179, and on said bushing there is mounted another bushing 180. The cam disks 181 and 182 are riveted to said second bushing 180. The arm 137 engages cam disk 181 (Figs. 22 and 17-19) and the big arm 145 engages cam disk 182. In the right end of the outer bushing 180 a disk 183 is fixed on which a coupling pawl 184 (Fig. 17) is pivotally mounted on a pin 185. A tension spring 186 tends to draw the coupling hook 184 to engage the tooth 177 driven by the driving motor of the machine, and when they engage each other the disk 183 and the cam disks 181, 182, which are rigidly connected with said disk, are coupled the shaft 175 which is driven by the motor at the operation of the machine, so that the cam disks rock the two arms 137, 145.

However, the coupling pawl 184 is normally kept locked in its position of rest, and thus out of engagement with the tooth 177, by a stop pawl 187 (Figs. 17 and 22) a projecting lug 187a of which engages and locks the pawl 184. The stop pawl 187 is pivoted on the pin 189 fixed on the sheet metal end wall 188 (Fig. 17) and is actuated by a tension spring 190 which holds the pawl in its locking position. When the stop pawl 187 releases the coupling pawl 184, the disk 183 and the cam disks 181, 182 are rotated about half a revolution, at which position they are stopped by a stop hook 191 a projecting lug 191a of which engages the coupling pawl 184 and disengages the same from the toothed disk 177. The stop pawl 191 is pivoted on a pin 192 fixed on the sheet metal end wall 188 (Fig. 22) and is normally kept in its locking position (for engagement with the coupling pawl 184) by a tension spring 193, but is raised from its engagement with said coupling pawl when the arm 150 is raised and the pin 194 fixed on said arm strikes the edge of the stop pawl 191. On the big arm 145 a stop pawl 195 for the counting gear wheel 143 is pivotally journalled on a pin 196 (Figs. 18 and 19). This stop pawl is urged to engage the gear wheel 143 by a tension spring 197. One end of said tension spring is fixed on the stop pawl 195 and the other end to the machine frame (the sheet metal end wall 188), and therefore this spring at the same time serves to hold down the big arm 145 against the cam disk 182. The gear wheel pawl 195 is lifted out of its engagement with the counting wheel 143 by the cam disk 182 which acts on the contact surface 195a of the S-shaped pawl 195.

To start the automatic multiplication the operator depresses the = key 17 which then actuates the swinging arm 198 (Figs. 3 and 4) which is pivoted on the stationary pin 199. Normally, this swinging arm is held in its inoperative position shown in Figs. 3 and 4, by a tension spring 200 which is stretched between said arm and the swing arm 102. When the arm 198 is rocked due to the depression of the key 17, a pin 201 riveted to said arm acts on a link 202 which is pivoted on the stationary pin 203. During this operation the edge of the link 202 strikes the pin 70 and the arm rocks the locking member 106 to engage the locking surface 45a.

At its right end the link 202 is shaped as a fork 202a which encloses the lower end of a multiplication operating arm 204 (Figs. 3 and 17). When the key 17 is depressed the arm 204 will consequently be swung counterclockwise (in Fig. 17) on the arm 115 on which it is pivoted, so that the link 205, which is pivoted on the pin 206 riveted to the arm 204, is lifted. This link now lifts the front (in Fig. 17 the left) end of the pawl 187 the forked end of which embraces the link 205 and is in engagement with a notched portion thereof. At the same time the link 205 also lifts the hook 156, because the link strikes the lug 156a of this hook. At its lower end the link 205 is enclosed by the forked end of the disconnecting arm 207 (Figs. 3 and 17) which is pivoted on the pin 108 and has two striking edges 207a and 207b. Said edges are actuated by the projecting flap 208a of the lever 208, which is pivoted on the pin 209a which is fixed on a flange on the left end wall 44 of the storage rotor 34 (cf. Figs. 5 and 26). The lever has a circular slot engaged by the pin 209 on the same flange to guide the lever. With its other end the lever 208 engages the feeler 123 and is actuated by the latter when it is moved in the axial direction.

*Plus-minus-selector*

The plus-minus-selector 211 is rockably journalled on the pin 210 (Figs. 3 and 4) on the bottom plate 104 and is actuated by a tension spring 212 which presses the selector to rest against the correction arm 141 if the latter is in its + position shown in dotted lines in Fig. 4. But if the correction arm 140 is in its − position shown in Fig. 3, a pin 213 riveted to the selector 211 engages the edge of the recess 104a in the plate 104 (Fig. 4). When the correction arm 140 is in its + position, the lug 135c rests on the shoulder 140a on said arm, as shown in Fig. 17. But in the — position of the correction arm the lug 135c rests against the shoulder 140b on this correction arm. (The different positions of the parts 140, 211 are also shown in Figs. 3A and 3B.)

On a pin 213 is pivoted the locking member 214 (Figs. 3A, 3B and 4) the front end of which (in Figs. 3A and B upper end) enters a slot in a link 215 which is displaceably and also to some extent rockably mounted on the pins 216 fixed on the bottom plate 106. At its rear end the locking member 214 is provided with an upturned lug 214a (see also Fig. 24) which in certain positions of the locking member locks the plus-multi-revolutions key 15 so that the same cannot be depressed. A recess in the link 215 is engaged by an upturned flap 198a on the arm 198 when the machine is coupled for automatic minus multiplication, as indicated in dot-and-dash lines in Fig. 3. When the operator depresses the = key 17, this key strikes against the arm 198 (Fig. 4) and rocks this arm counterclockwise which causes the link 215 to be displaced in the direction of the arrow H. The locking member 214 will then assume the positions III and IV respectively (Fig. 3B) according as the correction arm 140 stands in its + position and — position respectively. If then the correction arm 140 is in the + position, the + key 15 is locked (position III in Fig. 3B).

At normal multiplication (plus multiplication or positive multiplication) the reversing arm 217 (Figs. 3 and 25) for the revolutions counter actuator (this arm substantially corresponds to the arm 225 in the U. S. Patent 2,398,-286) is in its rear position shown in full lines (i. e. lower position in Fig. 3 and left position in Fig. 25, respectively), and now acts on the contact surface 215a on the arm 215, which thereby is swung backwards in the machine to its position shown in full lines in Figs. 3 and 4 and is locked in this position against displacement in its longitudinal direction (i. e. the lateral direction in the machine) by the engagement of the pins 216 with the front (in Fig. 4 upper) parts of the slots in the arm. At the same time the arm 215 leaves its engagement with the projection 198a. In this position of the arm 215 the locking member 214 assumes the positions I and II respectively in Fig. 3A, according as the correction arm 140 is in its + position and — position, respectively. From Fig. 3A it is apparent that the + key is stopped when the correction arm 140 is in its — position, but is free when said arm is in its + position. It should be observed that the — key 14 is never actuated by the locking device.

Mode of operation

In a calculating operation the described devices operate in the following manner:

Suppose that the number "97,042" is to be plus multiplied (multiplied in the positive direction) by a multiplicand of arbitrary value (within the limits of the capacity of the machine). First the number "97,042" is set as multiplier by means of the keys 0—9, as has been explained above under the heading: Setting the multiplier, and then a multiplicand is set, as described above under the heading: Setting the multiplicand. During this operation the disconnecting lever 19 must be in its left position in order to obtain the correct step feeding direction for the two rotors 32 and 34. The operator now depresses the = key 17 manually.

In the manner described above the lever 187 will now be moved out of engagement with the coupling pawl 184 which is now swung to engage the tooth 177. The depression of the = key 17 also causes the arm 204 to be swung counterclockwise in Fig. 17 so that its projecting lug 204a lifts the pin 218 (Figs. 16 and 17) whereby in well-known manner the contacts for the electric motor are closed (the pin 218 is identical with the pin 332 on the arm 331 in the U. S. Patent 2,398,286) so that the motor starts and, via the coupling 177, 184 which has been thrown into gear, drives the disk 183 and the cam disks 181, 182 (Fig. 22). During this operation the cam disk 182 (Fig. 19) moves the stop pawl 195 out of engagement with the counting gear wheel 143. At the same time the cam disk 181 swings the arm 137 engaging the same, said arm swinging the arm 133 (via the pin 138) clockwise in Figs. 17-19. (The tension spring 134 presses the arm 137 to engage the cam disk 181.) When in this manner the arm 133 has rocked the feeler shaft 120 slightly more than one step (pitch), the arm 133 during its clockwise movement strikes the shoulder 135a so that the gear segment 135 begins to be rocked clockwise. Then the shoulder 135b slides on the surface 137a so that during the whole rocking movement the shoulder 135a rests against the arm 133. Thus, the gear segment does not leave the arm 133. Consequently, the shaft 120 rocks the feeler 123, 124 towards the first storage disk which now is to be felt. In the example chosen this feeler disk is set at the numerical value "2." At the rotation of the gear segment 135 the shoulder 135c lets loose the bead 140c on the correction arm 140 a short time before said segment has been rotated one step and the arm 140 is swung by the spring 142 clockwise to its — position in which the projection 135c engages the contact surface 140b.

When the feeler arm 123, 124 is stopped by that shoulder on the storage disk which corresponds to the numerical value "2," the counting gear wheel 143 has been rocked a distance corresponding to two teeth. The slide 147 moves to its position b (Fig. 28B). After the time interval which would have been necessary for the feeler to move against the storage disk in order to feel the numeral value "9," the latch 195 is liberated from the cam disk 182 and is swung by its spring 197 to engage the counting gear wheel 143 and lock the same. Then the cam disk 182 swings the big arm 145 clockwise in Fig. 17. The coupling pawl 184 is caught by the arm 191 so that the coupling 184, 177 is disconnected and the cam disks 181, 182 stop in mid cycle position. The counting gear wheel has now been rotated two teeth counterclockwise (and been locked in its new position). As the slide 147 now is in its position b, its arm 147a passed by the projection 150a without actuating the same (when the arm was rocked clockwise). But the projection 147b of the slide 147 via the small slide 151 actuates the correction arm 140 and moves said arm back to its + position. The shoulder 147c of the slide 147 lifts the arms 154, 155. As the locking member 214 is in the position I (Fig. 3A) and thus the + key 15 is not locked, said key as well as the key 14 follow the swinging motion of the arms 154 and 155, respectively. In well-known manner the rotor or actuator 32 will now start in + revolutions (as described in detail in the U. S. Patent No.

2,488,011; the coupling rods 28 and 29 in this patent are liberated when the just mentioned plus multi-revolutions keys are swung, and at the moment when the keys are actuated by the slide 147, the pusher 23 indicated in said patent is in such a position that it engages the + coupling bar 28 so that the actuator is started in + revolutions). Consequently, the counting tooth 172 also rotates in plus revolutions, i. e. counterclockwise in Fig. 17, and thus begins to count the counting gear wheel 143 back to zero, one step (= one tooth pitch) for each revolution of the shaft 174 of the revolutions counter actuator. When said wheel is rotated the last step, the pin 169 (Fig. 18) which is rigidly connected with said gear wheel, strikes the left (front) arm 165a so that the arm 150 is swung upwards and thereby, in the manner described above under the heading The feeler, disconnects the motor from the actuator 32, the rotor 32 stops in its full-cycle position and starts an automatic step shifting. The pin 194 raises the hook 191 (counterclockwise in Fig. 17) so that the coupling 184, 177 is brought into engagement again and the cam disks 181, 182 begin to rotate again. Now the cam disk 181 lifts the arm 137 (clockwise) which rocks the feeler 123, 124 back to its position of rest. However, the right part of the cam 181 first swings the arm 137 further clockwise in Fig. 17 which, in the manner indicated above under The feeler, via the parts 125a, 131 (Fig. 1) causes a step shifting of the feeler 123, 124. Meanwhile the gear segment 135 has been stopped by the shoulder 140a (Fig. 18). The big arm 145 falls down again (counterclockwise in Fig. 18) and the counting gear wheel 143 is again brought into mesh with the gear segment 135. When the coupling pawl 184 passed by the locking arm 187, the pin 145a of the arm 145 held the arm 204 raised by striking against the edge of said arm 204, and the cam disks 181, 182 are thus not stopped in their rotation because the arm 137 cannot release the coupling pawl 184.

The arm 145 can not fall down again until after the point of the coupling pawl 184 has passed by the projection 187a. The feeler 123, 124, which has been step shifted meanwhile, is now driven by the spring 134 towards the shoulder on the next feeler disk on which the numeral "4" is set. The counting gear wheel 143 is now advanced four steps and the actuator 32 runs four revolutions in an analogous manner, after which it is stopped and shifted one step just as was the feeler 123. (The storage rotor 34 stands still during the whole feeling operation.) The gear segment stops again when it strikes the shoulder 140a.

Now the next numeral, which is "0" in the example selected, is felt in the storage rotor 34. Therefore, the slide 147 is in the position a during the feeling operation. The bead or projection 140c on the correction arm 140 then engages the projection 135c from above and thereby prevents the correction arm 140 from falling down because the gear segment 135 has not moved from its position of rest. When now the big arm 145 is lifted, the shoulder 147a on the slide 147 strikes against the shoulder 159a so that the actuator 32 is shifted one step. As the arms 154, 155 are not actuated, the actuator 32 is not started again. The hook 191 having been lifted by the pin 194, the coupling 177, 184 remains in gear, and therefore the next numeral, which is "7," is felt in the feeler rotor 34.

During this operation the counting gear wheel is rocked seven steps in an analogous manner, and the slide 147 comes consequently to its position c. The arm 140 falls down but will not be raised again because, when the slide is in its position c, its shoulder 147b passes by the projection 151a without actuating the same. The arms 154, 155 are swung out again by the projection 147c but, as the arm 140 is in its — position (of Figs. 3A and 3B) the + key 15 is locked, while on the other hand the ÷ key 14 is actuated. The actuator 32 is therefore started in — revolutions (see the arrows in Fig. 1), i. e. clockwise in Figs. 1 and 17. The counting tooth 172 consequently now rotates clockwise and thus drives the counting gear wheel 143 back to zero in the counterclockwise direction, thus 10−7=3 steps, and when this has taken place the arm 165 stops the machine again in the manner described above. The following figures are now visible in the revolutions counter: 99997042.

When now the gear segment 135 goes back to counterclockwise, it is stopped by the shoulder 140b and is thus arrested in a position which is displaced one tooth in comparison with the previous position of rest of the segment (with the projection 135c against the shoulder 140a). When now the last numeral, which is "9," is felt in the feeler rotor 39, the counting gear wheel 143 will consequently be rocked 1+9=10 steps, i. e. a whole revolution. Due to this the slide 147 comes to its position a, and when the big arm 145 is lifted, it only effects step shifting of the actuator 32. The gear sector 135 will then be stopped again by the shoulder 140b. At the step shifting operation (to the left in Figs. 3 and 5) of the feeler 123, 124 which now is taking place, the feeler strikes against the lever arm 208 which is swung clockwise and swings the arm 207 clockwise in Fig. 3. Due to this the spring 207c is tensioned which has held this arm and thus also the link 205 in connected position. The link 205 (Fig. 17) is thus swung out of engagement with the pawl 197 which now becomes free and is drawn by the spring 190 towards its operative position for disengaging the coupling pawl 184. However, this coupling pawl is not disengaged until said pawl has passed by the projection 187a and a new feeling operation is effected. At this feeling operation the feeler 123, 124 strikes against a shoulder 44a (Figs. 1, 3, 5 and 5A) on the end wall 44 of the feeler rotor. This shoulder has the same height as the shoulder 39e for "0" on the feeler disks 39. Consequently a feeling operation for the valve "0" is effected. As the gear segment 135 now is engaging the shoulder 140b, the counting gear wheel thus will be rocked 1+0=1 step at this feeling operation. Therefore the slide 147 comes into its position b, the arm 140 is swung counterclockwise in Fig. 17 and the actuator makes a + revolution and then stops. The coupling pawl 184 continues the rotation but is caught by the arm 187 and is disengaged; it stops with the arm 145 in its lower position and the arm 137 in its position of rest. The gear segment is now arrested by the shoulder 140a.

It should perhaps be mentioned that, when the machine is set for minus multiplication (negative multiplication or multiplication in the minus direction, see the U. S. Patent 2,398,286 issued April 9, 1946, the main actuator rotates in + revolutions when the arm 140 is in its — position (the projection 135c resting against the shoulder 140b), while said actuator rotates in — revolutions when the arm 140 is in its + position (Fig. 18); thus exactly contrary to what is the case in plus multiplication. Thus, in minus multiplication the complementary value of the product is registered in the accumulator. In other words, the product is automatically subtracted from the amount already entered into the accumulator or product register.

As the arm 208 is pivoted on the storage rotor 34 and thus follows this rotor, when the latter is step shifted, and furthermore the edge 207b (Fig. 3) on the arm 207 in the disengaged position in parallel with the shafts 49 and 120, disengagement will as a rule take place in the manner just described because one figure more than the number of figures set in the feeler rotor is felt. This additional feeling operation takes place against the shoulder 44a (Figs. 1, 3, 5 and 5A). However, there is an exception. The calculating machine shown in the drawings has eight numeral wheels in the revolutions counter and thus also eight storage disks 36 in the rotor 34. If now the amount 99999999 is set in the storage rotor and the machine is started (after a multiplicand has been entered, for example) the numerical value "9" is felt on all feeler disks 39. Consequently, the main actuator and the revolutions counter actuator make a — revolution in the first (lowest) denomination (when plus multiplication is effected), the numeral "9" appearing on all numeral wheels of the revolutions counter. All following denominations in the feeler rotor are now felt as 1+9=10 and consequently the main actuator 32 (and the revolutions counter actuator) only will be step shifted without rotating. The short-cut multiplication will in this example be effected according to the following scheme:

```
"k"  8 7 6 5 4 3 2  1   denomination
     1 0 0 0 0 0 0 -1   + revolution
     ─────────────────
     9 9 9 9 9 9 9  9
```

However, there is no "k" denomination in the revolutions counter for the necessary revolution of correction (+ revolution after step shifting to the eight denomination), but the machine must count 10 revolutions in the eighth (highest) denomination to order that the correct result shall be obtained. To effect this the arm 207 is provided with a striking surface (cam surface) 207a (Fig. 3), and the projection 208a on the lever arm 208 is in front of this projection 207a when the maximum number (that is: eight in the example discussed) of numerals are set in the storage rotor 34. It will be seen from Fig. 3 that the projection 207a is so high that the feeler 123, via the arm 208 with its projection 208a, will move the arm 197 by engagement with the projection 207a as the feeler 123 moves to the feeling position at the last (extreme left) disk 39, thus when the feeler 123 is shifted its last step to the left. From the example of calculation earlier described in detail it is clear that this step shifting of the feeler 123 is not made until the coupling pawl 184 already has passed by the projection 187a. The highest (extreme left) disk 39 is thus felt and the counting gear wheel 143 is rotated ten steps. If the slide (Fig. 17) now should work as in the other cases, it would first move to its position b, then to its position c and finally back to its position a.

However, immediately before the feeling of the last numeral in the feeler rotor 34, the arm 207 has swung the link 205 counterclockwise (Fig. 17). The upper edge of said link passes freely by the projection 156a on the pawl 156 when the arm 145 moves back. When at the last feeling operation the slide 147 comes to its position b (Fig. 28B) the stop pawl 156 falls down (clockwise in Fig. 17) and engages the projection 147d so that the slide 147 is prevented from going back to the position a via the position c. But, when the arm 207 and thus also the arm 205 are in their positions of rest, the upper edge of the arm 205 moves the pawl 156 away counterclockwise in Fig. 17 and thus prevents this pawl from engaging the shoulder 147d on the slide 147 and thereby from latching said slide. Thus, the slide 147 is now latched in its position b. When now at the operation of the machine, the arm 145 is lifted (clockwise), the correction arm 146 will be lifted to its + position. This causes the actuator 32 to be started in + revolutions and, after it has finished ten revolutions, it is disengaged and all parts of the storage rotor return to their positions of rest in the manner described above. When the arm 145 was lifted, the counting gear wheel 143 was in its zero position (position a) with the pin 169 directed upwards although the slide 147 had been latched or locked in its position b. Thus, the pin 169 first passes upwards between the arms 166a and must rotate a full revolution before it swings the stop device (knee-joint) 165 and thereby lifts the stop arm 150 which stops the machine.

After the automatic multiplication has been finished, the multiplicand can be read off in the indicator or setting register (at 23 in U. S. Patent No. 2,108,596) the multiplier in the revolutions counter (at 99 in U. S. Patent No. 2,108,596) and the result in the results register or accumulator (at 74 in U. S. Patent No. 2,108,596).

It should be pointed out that if, after completed setting of the multiplier (see Setting the multiplier above), the × key 16 is not depressed but instead of it the = key 17, the machine effects an automatic multiplication with one and the same item (i. e. the multiplier set) in the rotor 32 as well as in the rotor 34. Thus, the machine effects a quadration or squaring of the number set.

If it is desired to multiply a number of different multiplicands with one and the same multiplier, the multiplier is first set at the same time in the rotors 32 and 34 and the actuator rotor 32 is cleared by depressing the × key 16. Then the first multiplicand is set and the product is calculated automatically, when the = key 17 is depressed. When this operation has been finished, only the actuator rotor 32 is cleared by depressing the × key 16, the multiplier remaining set unaltered in the storage rotor 34, but the feeler has been returned to its zero position. It is suitable to clear the revolutions counter simultaneously by means of the clearing arm B (Fig. 3); whether also the accumulator is to be cleared (by means of the clearing arm A) depends upon the fact if it is desired to accumulate the different, successive products in the accumulator or not. A new multiplicand is now set in the actuator rotor 32 by means of the amount keys 0—9, and when the = key 17 is depressed again, the new multiplication is automatically effected with the same multiplier remaining in the feeler rotor 34. The procedure may be repeated any number of times with other multiplicands.

If the 0-key 20 (Fig. 17) is depressed, the actuator rotor 32 as well as the storage rotor 34 is cleared.

Thus, the machine has one single keyboard and one single indicator mechanism or setting register (at 23 in U. S. Patent No. 2,108,596). Yet, it can effect all the automatic operations of multiplication indicated above.

It should perhaps be expressly mentioned here that the statements above regarding plus multiplication apply also to minus multiplication. Shifting to minus multiplication is effected in well-known manner (see U. S. Patent No. 2,398,286) by means of the shifting button 219 (Fig. 25) which in the U. S. Patent No. 2,398,286 corresponds to the button 234.

In other respects the machine operates as indicated in the U. S. Patent No. 2,398,286. Thus, it can effect operations of addition and subtraction (with automatic clearing of the actuator rotor 32 and also of the storage rotor 34 after each operation) as well as automatic operations of division. The machine can also effect semi-automatic operations or completely manually controlled operations of multiplication in the manner which is stated more particularly in said U. S. Patent No. 2,398,286.

Having now described our invention, what we claim as new and desire to secure by Letters Patent is:

1. In a calculating machine for automatic multiplication, in combination, an ordinally shiftable actuator for the multiplicand, an ordinally shiftable storage device for the multiplier, a single ten-key-board, shifting means for said actuator and said storage device under the control of said key-board, said actuator and said storage device being normally operatively ordinally aligned with and connected to said key-board to be set thereby simultaneously and in parallel, means for clearing said actuator, and an operations key for initiating clearing of said actuator and ordinal step shifting of said storage device into a half-step position to render keyboard operation ineffective as respects said storage device while retaining effective connection to said actuator to permit entry of a multiplicand into the cleared actuator.

2. In a calculating machine for automatic multiplication, in combination, an ordinally shiftable actuator for the multiplicand, an ordinally shiftable storage device for the multiplier, common setting arms for said actuator and said storage device, a single ten-key-board for actuating said setting arms, step-shifting means for said actuator and said storage device under the control of said key-board, said actuator and said storage device being normally ordinally aligned with and in the paths of motion of said arms to be set thereby simultaneously and in parallel, clearing means for said actuator, and an operations key for starting said clearing means and for actuating said step shifting means to stop said storage device in a half-step position, in which said arms pass freely by said storage device without actuating it.

3. In a calculating machine for automatic multiplication, in combination, an ordinally shiftable actuator for the multiplicand, an ordinally shiftable storage device for the multiplier, a keyboard of ten-key type operable to simultaneously set a multiplier into said actuator and into said storage device, a step-shifting device for simultaneously step-shifting said actuator and said storage device ordinally during the setting of the multiplier into said storage device, an operations key, means controlled by said operations key for disconnecting said key-board and said step-shifting device from said storage device, and means controlled by said operations key for initiating clearing of said actuator.

4. In a calculating machine for automatic multiplication, in combination, an ordinally shiftable actuator for the multiplicand, an ordinally shiftable storage device for the multiplier, a keyboard of the ten key type operable to simultaneously enter a multiplier into said actuator and said storage device in parallel, a common step shifting mechanism for said actuator and said storage device, means for clearing said actuator, an operations key, means controlled by said operations key for disconnecting said storage device from said keyboard and for starting said clearing means to permit entry of a multiplicand into said actuator alone, and a product key operable subsequent to operation of said operations key to initiate multiplication of a multiplicand and a multiplier, said product key also being operable without operation of said operations key to initiate multiplication of the multiplier by itself to effect a squaring operation.

5. In a calculating machine for automatic multiplication, in combination, an ordinally shiftable actuator for the multiplicand, an ordinally shiftable storage device for the multiplier, a keyboard of the ten key type for entering items into said actuator and said storage device simultaneously and in parallel, a common ordinal step-shifting mechanism for said actuator and said storage device, an operations key for disconnecting said storage device from said step shifting mechanism and said keyboard, a product key, a sensing mechanism for sequentially sensing the values in various denominational orders of said storage device, means for effecting a plurality of rotations of said actuator corresponding to the sensed value in each denominational order, means under control of said product key for initiating operation of said sensing mechanism, and means also under control of said product key for coupling said sensing mechanism and said actuator for simultaneous corresponding ordinal step shifting movement from one denominational order to another.

6. In a calculating machine for automatic multiplication, in combination, an ordinally shiftable actuator for the multiplicand, an ordinally shiftable storage device for the multiplier, a keyboard of the ten key type for entering items into said actuator and said storage device simultaneously and in parallel, a common ordinal step shifting mechanism for said actuator and said storage device, an operations key for disconnecting said storage device from said step shifting mechanism and said keyboard, a product key, a sensing mechanism for sequentially sensing the value in the various denominational orders of said storage device, means for effecting a plurality of rotations of said actuator corresponding to the sensed value in each denominational order, means under control of said product key for initiating operation of said sensing mechanism, means also under control of said product key for coupling said sensing mechanism and said actuator for simultaneous corresponding ordinal step shifting movement from one denominational order to another, a clearing key to effect simultaneous clearing of said actuator and said storage device upon completion of the multiplication operation, and means for clearing said actuator alone to permit a plurality of sequential multiplications in which the same multiplier is utilized.

STURE TOORELL.
ERIK GRIP.

(References on following page)

REFERENCES CITED

The following references are of record in the file of this patent:

UNITED STATES PATENTS

| Number | Name | Date |
| --- | --- | --- |
| 1,608,145 | Tingley | Nov. 23, 1926 |
| 1,793,155 | Britten, Jr. | Feb. 17, 1931 |
| 1,972,437 | Kottmann | Sept. 11, 1934 |
| 2,108,596 | Rudin | Feb. 15, 1938 |
| 2,229,630 | Avery | Jan. 28, 1941 |
| 2,309,240 | Chase | Jan. 26, 1943 |
| 2,374,333 | Crosman | Apr. 24, 1945 |
| 2,379,877 | Britten, Jr. | July 10, 1945 |
| 2,397,745 | Kiel | Apr. 2, 1946 |
| 2,398,286 | Carlstrom et al. | Apr. 9, 1946 |

FOREIGN PATENTS

| Number | Country | Date |
| --- | --- | --- |
| 208,976 | Switzerland | June 17, 1940 |
| 437,743 | Great Britain | Nov. 4, 1935 |
| 509,747 | Great Britain | July 20, 1939 |

OTHER REFERENCES

Ser. No. 310,080, Pott (A. P. C.), published May 25, 1943.

Certificate of Correction

Patent No. 2,560,910                                                      July 17, 1951

STURE TOORELL ET AL.

It is hereby certified that error appears in the printed specification of the above numbered patent requiring correction as follows:

Column 2, line 31, for "of the" read *on the*; column 3, line 33, for "states" read *stated*; column 4, line 42, for "the proper of the feeler mechanism" read *the feeler proper of the mechanism*; column 11, line 9, for "opening" read *operating*; line 15, before "operating" insert *engages*; column 12, line 14, strike out "the", first occurrence; column 14, line 36, before the numeral "123" insert *feeler*; line 37, before "projection" insert *feeler*; column 18, line 70, for "arm 141" read *arm 140*; column 22, line 7, for "(of Figs. 3A" read (*cf. Figs. 3A*; line 20, after "back" strike out "to"; line 41, for "pawl 197" read *pawl 187*; line 52, for "valve" read *value*; column 23, line 10, for "in" before "parallel" read *is*;

and that the said Letters Patent should be read as corrected above, so that the same may conform to the record of the case in the Patent Office.

Signed and sealed this 2nd day of October, A. D. 1951.

[SEAL]

THOMAS F. MURPHY,
                                                         *Assistant Commissioner of Patents.*